(12) United States Patent
Ogawa et al.

(10) Patent No.: US 10,478,971 B2
(45) Date of Patent: Nov. 19, 2019

(54) SPHERICAL ROBOT HAVING A DRIVING MECHANISM FOR INDICATING AMOUNT OF STORED ELECTRIC POWER

(71) Applicant: Panasonic Intellectual Property Management Co., Ltd., Osaka (JP)

(72) Inventors: Kento Ogawa, Osaka (JP); Ryouta Miyazaki, Osaka (JP); Michiko Sasagawa, Osaka (JP); Yuji Kunitake, Kyoto (JP); Seiya Higuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 203 days.

(21) Appl. No.: 15/806,097

(22) Filed: Nov. 7, 2017

(65) Prior Publication Data
US 2018/0056519 A1    Mar. 1, 2018

Related U.S. Application Data

(63) Continuation of application No. PCT/JP2017/015993, filed on Apr. 21, 2017.

(30) Foreign Application Priority Data

May 6, 2016    (JP) ................................ 2016-093001

(51) Int. Cl.
*G06F 19/00*    (2018.01)
*B25J 11/00*    (2006.01)
(Continued)

(52) U.S. Cl.
CPC ............ *B25J 11/0015* (2013.01); *A63H 3/28* (2013.01); *A63H 5/00* (2013.01); *A63H 11/00* (2013.01);
(Continued)

(58) Field of Classification Search
CPC ........ B25J 11/0015; B25J 5/00; B25J 19/021; B25J 19/026; B60L 58/13; A63H 3/28;
(Continued)

(56) References Cited

U.S. PATENT DOCUMENTS 3,821,995 A * 7/1974 Aghnides ................ B60B 19/00
180/6.2
4,310,987 A * 1/1982 Chieffo .................. A63H 29/22
446/175
(Continued)

FOREIGN PATENT DOCUMENTS

JP    2002-059389    2/2002
WO    2000/038295    6/2000

OTHER PUBLICATIONS

International Search Report of PCT application No. PCT/JP2017/015993 dated May 23, 2017.

*Primary Examiner* — Ronnie M Mancho
(74) *Attorney, Agent, or Firm* — Greenblum & Bernstein, P.L.C.

(57) ABSTRACT

A robot includes a main casing, a first spherical cap and a second spherical cap, and a shaft linking the spherical caps. The robot further includes a display, a first driving mechanism causing the first and second spherical caps to be rotated by the shaft, and a second driving mechanism that causes the main casing to be rotated. The robot also includes a control circuit and an electric power source, charged by electric power from an external charger. If the remaining electric power of the electric power source is lower than or equal to a predetermined value, the second driving mechanism is controlled to stop rotation of the main casing, and the first driving mechanism is controlled to switch a rotational direction of the first spherical cap and the second spherical cap, causing the display to be reciprocally moved in a vertical direction.

18 Claims, 12 Drawing Sheets

(51) Int. Cl.
| | | |
|---|---|---|
| *A63H 11/00* | (2006.01) | |
| *B25J 5/00* | (2006.01) | |
| *B25J 19/02* | (2006.01) | |
| *A63H 33/00* | (2006.01) | |
| *A63H 3/28* | (2006.01) | |
| *A63H 5/00* | (2006.01) | |
| *B60L 58/13* | (2019.01) | |

(52) U.S. Cl.
CPC .............. *A63H 33/005* (2013.01); *B25J 5/00* (2013.01); *B25J 19/021* (2013.01); *B25J 19/026* (2013.01); *B60L 58/13* (2019.02); *A63H 2200/00* (2013.01)

(58) Field of Classification Search
CPC ........ A63H 5/00; A63H 11/00; A63H 33/005; A63H 2200/00
USPC .................................................. 700/245, 259
See application file for complete search history.

(56) References Cited

U.S. PATENT DOCUMENTS

| | | | |
|---|---|---|---|
| 4,519,466 A * | 5/1985 | Shiraishi | B60B 19/00 180/252 |
| 6,144,128 A * | 11/2000 | Rosen | B60L 50/30 310/74 |
| 6,227,933 B1 * | 5/2001 | Michaud | A63H 33/005 446/458 |
| 6,458,008 B1 * | 10/2002 | Hyneman | A63H 1/00 446/233 |
| 6,902,464 B1 * | 6/2005 | Lee | A63H 5/00 446/409 |
| 9,090,214 B2 * | 7/2015 | Bernstein | B60R 11/00 |
| 9,429,940 B2 * | 8/2016 | Bernstein | G05D 1/0022 |
| 9,766,620 B2 * | 9/2017 | Bernstein | A63H 30/04 |
| 9,829,882 B2 * | 11/2017 | MacGregor | G05D 1/0011 |
| 9,968,864 B2 * | 5/2018 | Clarke | G05D 1/0225 |
| 10,168,701 B2 * | 1/2019 | Berberian | G05D 1/0038 |
| 2004/0182614 A1 * | 9/2004 | Wakui | B25J 5/007 180/7.1 |
| 2004/0192163 A1 * | 9/2004 | Siegel | A63B 43/04 446/486 |
| 2004/0198159 A1 * | 10/2004 | Xu | A63H 15/06 446/325 |
| 2005/0004723 A1 * | 1/2005 | Duggan | G05D 1/0061 701/24 |
| 2007/0192910 A1 * | 8/2007 | Vu | B25J 5/007 700/245 |
| 2007/0215394 A1 * | 9/2007 | Sun | B62D 57/00 180/8.1 |
| 2008/0086241 A1 * | 4/2008 | Phillips | G05D 1/0038 701/2 |
| 2009/0078484 A1 * | 3/2009 | Kocijan | B60L 13/04 180/167 |
| 2009/0133467 A1 * | 5/2009 | Mori | G01C 19/00 73/1.77 |
| 2010/0032224 A1 * | 2/2010 | Liu | B25J 5/007 180/218 |
| 2011/0035054 A1 * | 2/2011 | Gal | G05D 1/0038 700/258 |
| 2011/0060492 A1 * | 3/2011 | Kaznov | B25J 5/00 701/27 |
| 2011/0132671 A1 * | 6/2011 | Lee | B25J 5/007 180/8.3 |
| 2011/0294397 A1 * | 12/2011 | Tsai | A63H 33/005 446/454 |
| 2011/0308873 A1 * | 12/2011 | Kim | B60K 1/04 180/218 |
| 2011/0313568 A1 * | 12/2011 | Blackwell | B25J 5/007 700/245 |
| 2012/0043149 A1 * | 2/2012 | Kim | B25J 11/002 180/218 |
| 2012/0059520 A1 * | 3/2012 | Kossett | B60B 1/042 700/264 |
| 2012/0197439 A1 * | 8/2012 | Wang | B25J 9/1689 700/259 |
| 2012/0215355 A1 * | 8/2012 | Bewley | B25J 5/005 700/258 |
| 2012/0244969 A1 * | 9/2012 | Binder | A63H 33/18 473/570 |
| 2012/0311810 A1 * | 12/2012 | Gilbert, Jr. | A47L 11/408 15/320 |
| 2013/0113307 A1 * | 5/2013 | Kim | H02K 5/04 310/40.5 |
| 2014/0008496 A1 * | 1/2014 | Ye | B64C 13/20 244/190 |
| 2014/0238762 A1 * | 8/2014 | Berberian | G05D 1/0038 180/167 |
| 2015/0175202 A1 * | 6/2015 | MacGregor | G05D 1/0011 701/2 |

* cited by examiner

SPHERICAL ROBOT HAVING A DRIVING MECHANISM FOR INDICATING AMOUNT OF STORED ELECTRIC POWER

BACKGROUND

1. Technical Field

The present disclosure relates to a robot driven by electric power charged from a charger.

2. Description of the Related Art

Heretofore, various types of robots have been proposed. Japanese Unexamined Patent Application Publication No. 2002-59389 discloses a dog-type robot, in which a charger to charge the batter of the pet robot is needed separate from the pet robot. The pet robot has a control circuit unit that, in a case where the remaining charge of the battery built into the pet robot falls to a predetermined value or lower, causes the pet robot to move by walking toward the charger (e.g., paragraph [0024]). On the other hand, when charging of the battery built into the pet robot ends, the pet robot is made to move by walking away from the charger (e.g., paragraph [0028]).

Domestic Re-publication of PCT International Publication for Patent Application No. 2000-38295 discloses a small ambulatory robot resembling a four-legged animal like a dog or a cat, in which the ambulatory robot is caused to perform certain actions when a rechargeable battery of the ambulatory robot is to be charged, in accordance with the amount of charge in the rechargeable battery. For example, when the ambulatory robot is placed on a charging stand, the ambulatory robot is caused to assume a charging pose representing weakness, where the head droops, the tail is lowered, and the front legs and hind legs sag (e.g., page 11, lines 12 through 18). On the other hand, when the charging of the rechargeable battery of the ambulatory robot is completed, the ambulatory robot is caused to execute actions of moving the neck upwards so as to raise the head, actions of nodding the head vertically, actions of wagging the tail vertically or horizontally, actions of raising the front legs and shaking them vertically or horizontally, or actions of stretching the overall front legs and rear legs to raise the torso (e.g., page 11 line 23 through page 12 line 14). However, the above-described related art has needed further improvement.

SUMMARY

In one general aspect, the techniques disclosed here feature a robot including: a spherical-band-shaped main casing where a first side portion of a sphere and a second side portion opposing the first side portion have been cut away; a first spherical cap corresponding to the first side portion; a second spherical cap corresponding to the second side portion; a shaft linking the first spherical cap and the second spherical cap; a display unit that is attached to the shaft via an arm and that displays at least a portion of a face of the robot; a first driving mechanism that causes the first spherical cap and the second spherical cap to be rotated by rotation of the shaft; a second driving mechanism, independent from the first driving mechanism, that causes the main casing to be rotated centered on the shaft; an electric power source that is charged by electric power from an external charger, and supplies the electric power to the first driving mechanism and the second driving mechanism; and a control circuit which, in a case where an amount of remaining electric power of the electric power source is a predetermined value or lower in a state where electric power is not being charged from the charger, controls the second driving mechanism and stops rotation of the main casing and controls the first driving mechanism to switch the rotational direction of the first spherical cap and the second spherical cap, thereby causing the display unit to be reciprocally moved in the vertical direction.

Further improvement has been realized by the above aspect.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
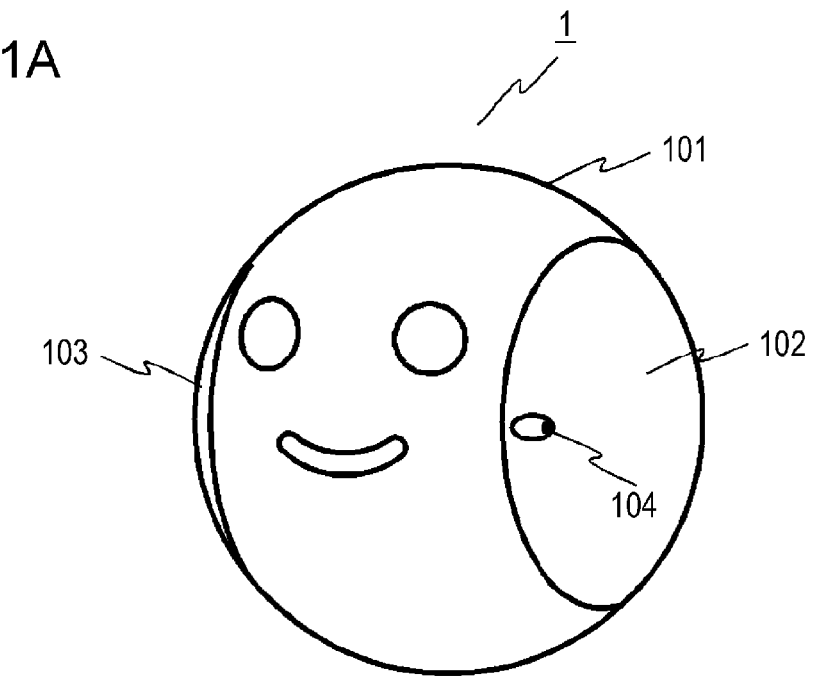
FIG. 1A is an external perspective view of a robot according to a first embodiment of the present disclosure.

Background Leading to Invention of Aspect According to Present Disclosure

First, observations that led to the present disclosure will be described. The above-described Japanese Unexamined Patent Application Publication No. 2002-59389 and the above-described Domestic Re-publication of PCT International Publication for Patent Application No. 2000-38295 relate to a dog-type pet robot. The pet robot has a torso portion that is provided with a head, four legs, a tail, and so forth. Accordingly, the pet robot can operate the head, four legs, and tail, to notify a user of the charged state within the robot.

In the above-described Japanese Unexamined Patent Application Publication No. 2002-59389, when the remaining charge of the battery built into the pet robot falls to a predetermined value or lower, the pet robot is caused to move by walking toward the charger, and on the other hand, when charging of the battery built into the pet robot ends, the pet robot is made to move by walking away from the charger.

Also, in Domestic Re-publication of PCT International Publication for Patent Application No. 2000-38295, when the ambulatory robot is placed on the charging stand, the ambulatory robot is caused to assume a charging pose representing weakness, where the head droops, the tail is lowered, and the front legs and hind legs sag, and on the other hand, when the charging of the rechargeable battery of the ambulatory robot is completed, the ambulatory robot is caused to execute actions of moving the neck upwards so as to raise the head, actions of nodding the head vertically, actions of wagging the tail vertically or horizontally, actions of raising the front legs and shaking them vertically or horizontally, or actions of stretching the overall front legs and rear legs to raise the torso.

However, in the above-described Japanese Unexamined Patent Application Publication No. 2002-59389, when the amount of charge of the battery built in the pet robot drops to a predetermined level or lower, the pet robot moves its legs to perform an operation of heading toward the charger, but does not moves its legs unrelated to the charger. Accordingly, the pet robot does not notify the user of the state of charge within the robot by moving its legs unrelated to the charger, even in a case where the remaining charge in the battery built into the pet robot reaches a predetermined value or lower.

In the same way, in the above-described Domestic Re-publication of PCT International Publication for Patent Application No. 2000-38295, the pet robot assumes various poses by moving its legs in a state where it is placed on the charging stand, thereby notifying the user of the state of charge within the robot, but there is no disclosure whatsoever regarding how the user is notified of the state of charge within the robot in a state where it is not placed on the charging stand.

Accordingly, the state of charge within the robot cannot be notified to the user unrelated to the charger in the above-described Japanese Unexamined Patent Application Publication No. 2002-59389 and the above-described Domestic Re-publication of PCT International Publication for Patent Application No. 2000-38295. For example, in a state where the charger is not beside the robot and the movements of the robot become sluggish, the user cannot determine whether the movements have become sluggish due to the amount of charge within the robot being low, or whether the movements have become sluggish due to malfunction.

In a case of a spherical robot that has neither arms nor legs, the robot cannot notify the user of the state of charge within the robot by moving its arms and legs, since it has no arms and legs. Also, in a case of a spherical robot, in a case where a face having eyes, a mouth, and so forth, for example, is to be displayed on the surface of the sphere, display of information related to the amount of charge, unrelated to the face, would be unnatural. Based on the above observations, the present inventor reached the aspects of the present disclosure below.

A robot according to an aspect of the present disclosure includes:

a spherical-band-shaped main casing where a first side portion of a sphere and a second side portion opposing the first side portion have been cut away;

a first spherical cap corresponding to the first side portion;

a second spherical cap corresponding to the second side portion;

a shaft linking the first spherical cap and the second spherical cap;

a display unit that is attached to the shaft via an arm and that displays at least a portion of a face of the robot;

a first driving mechanism that causes the first spherical cap and the second spherical cap to be rotated by rotation of the shaft;

a second driving mechanism, independent from the first driving mechanism, that causes the main casing to be rotated centered on the shaft;

an electric power source that is charged by electric power from an external charger, and supplies the electric power to the first driving mechanism and the second driving mechanism; and a control circuit which, in a case where an amount of remaining electric power of the electric power source is a predetermined value or lower in a state where electric power is not being charged from the charger, controls the second driving mechanism and stops rotation of the main casing and controls the first driving mechanism to switch the rotational direction of the first spherical cap and the second spherical cap, thereby causing the display unit to be reciprocally moved in the vertical direction.

According to this aspect, in a case where the remaining electric power of the electric power source drops to a predetermined value or lower in a state where electric power is not being charged from the charger, the display unit is reciprocally moved in the vertical direction, expressing a state of the robot being out of breath or a state of being sleepy. In this case, the display portion displays a part of the face of the robot, the eyes for example. Accordingly, even if the robot is spherical without arms or legs, for example, the state of the electric power source can be expressed to the user using rotational movement of the sphere, without making a display expressing the remaining amount of electric power of the electric power source on the surface of the spherical robot.

EMBODIMENTS

Embodiments of the present disclosure will be described below with reference to the drawings. Note that the same components in the drawings are dentoed by the same reference numerals.

First Embodiment

Overall Configuration

Figure 1B:
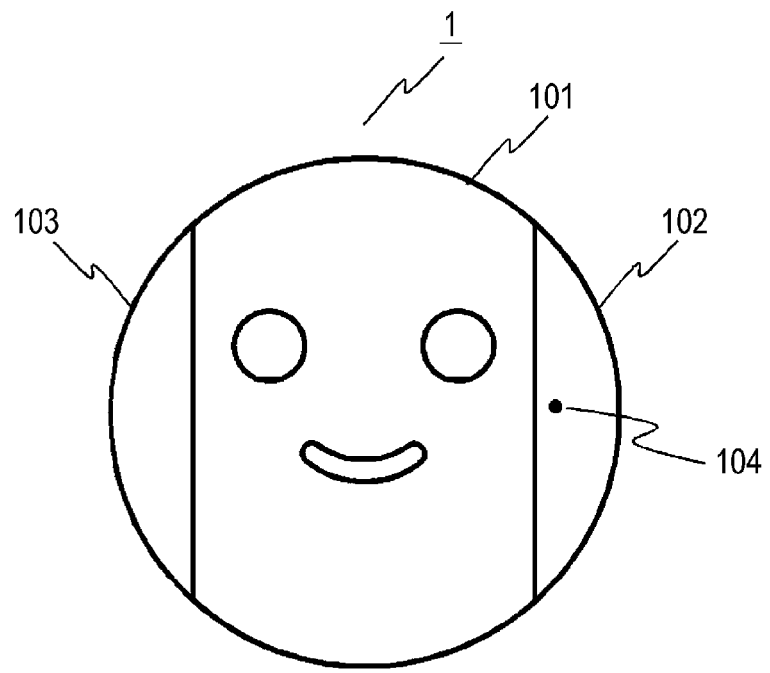
FIG. 1B is an external front view of the robot according to the first embodiment of the present disclosure.

FIG. 1A is an external perspective view of a robot 1 according to a first embodiment of the present disclosure. FIG. 1B is an external front view of the robot 1 according to the first embodiment of the present disclosure. The robot 1 has a main casing 101 in the form of a spherical band, a first spherical cap 102, and a second spherical cap 103, as illustrated in FIGS. 1A and 1B. The main casing 101, first spherical cap 102, and second spherical cap 103 make up an overall sphere. That is to say, the robot 1 has a spherical shape. The robot 1 also has a camera 104 provided to the first spherical cap 102, as illustrated in FIG. 1A. The camera 104 acquires video of the environment around the main robot 1. Although the robot 1 has the camera 104 provided to the first spherical cap 102 in the present embodiment, this is not restrictive. It is sufficient for the camera 104 to be provided to at least one of the first spherical cap 102 and second spherical cap 103.

Figure 2:
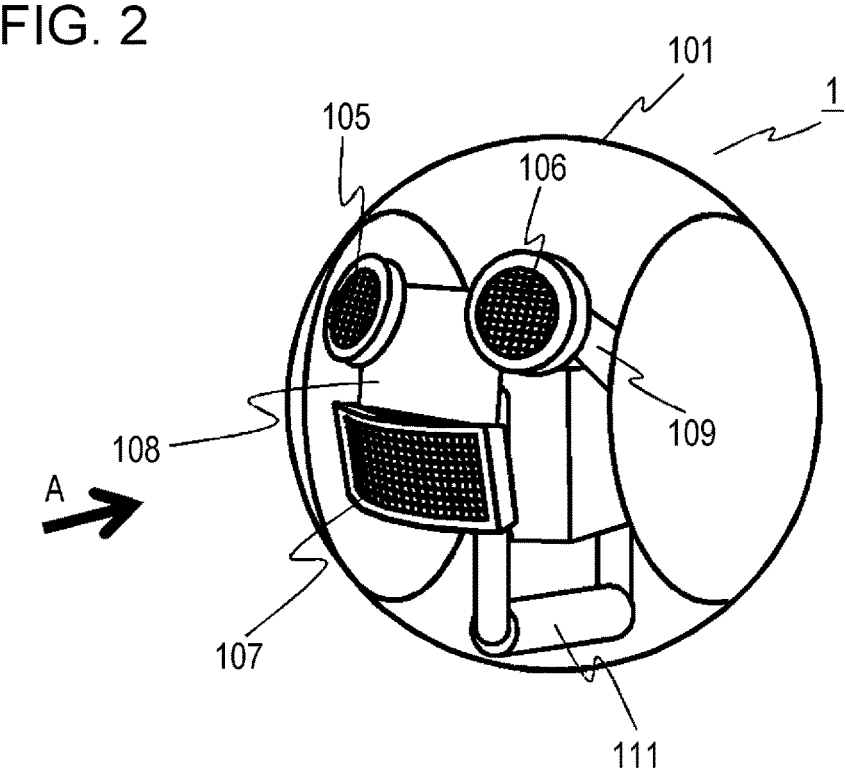
FIG. 2 is an internal perspective view of the robot according to the first embodiment of the present disclosure.
Figure 8:
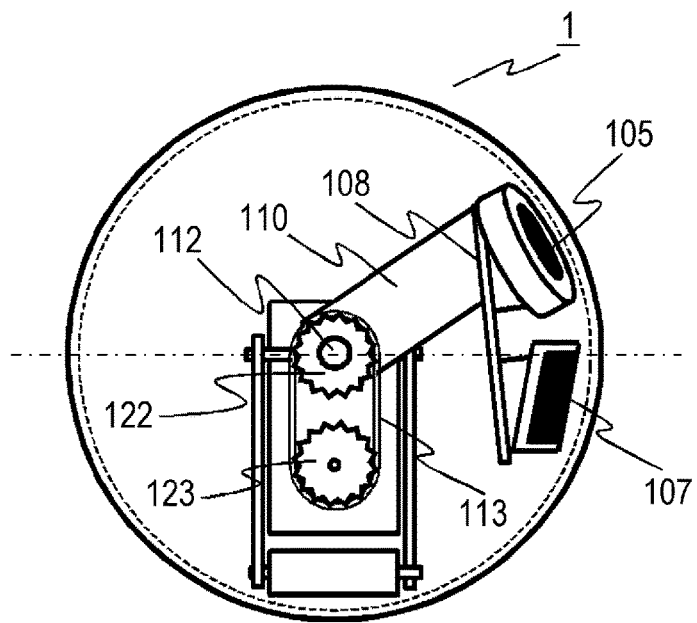
FIG. 8 is a side view illustrating the first driving mechanism of the robot according to the first embodiment of the present disclosure, as viewed from direction C in FIG. 6.

FIG. 2 is an internal perspective view of the robot 1 according to the first embodiment of the present disclosure. In FIG. 2, a first display unit 105, a second display unit 106, and third display unit 107 are provided to a fixing metal plate 108. The fixing metal plate 108 is attached to a shaft 112 (FIG. 3) via a first arm 109 and second arm 110 (FIG. 8). The first display unit 105, second display unit 106, and third display unit 107 are made up of multiple light-emitting diodes, for example. The first display unit 105, second display unit 106, and third display unit 107 display emotion display information of the robot 1. Specifically, the first display unit 105, second display unit 106, and third display unit 107 display part of the face of the robot 1, such as eyes and a mouth for example, as illustrated in FIGS. 1A and 1B, by individually controlling lighting of the multiple light-emitting diodes.

The robot 1 has a weight 111 toward the bottom within the main casing 101, as illustrated in FIG. 2. Accordingly, the center of gravity of the robot 1 is situated at a position lower than the center of the main casing 101. Thus, the actions of the robot 1 can be stabilized. Details of a weight driving mechanism 211 (FIG. 16), and operations of the weight driving mechanism 211 (FIG. 16), will be described later.

Figure 3:
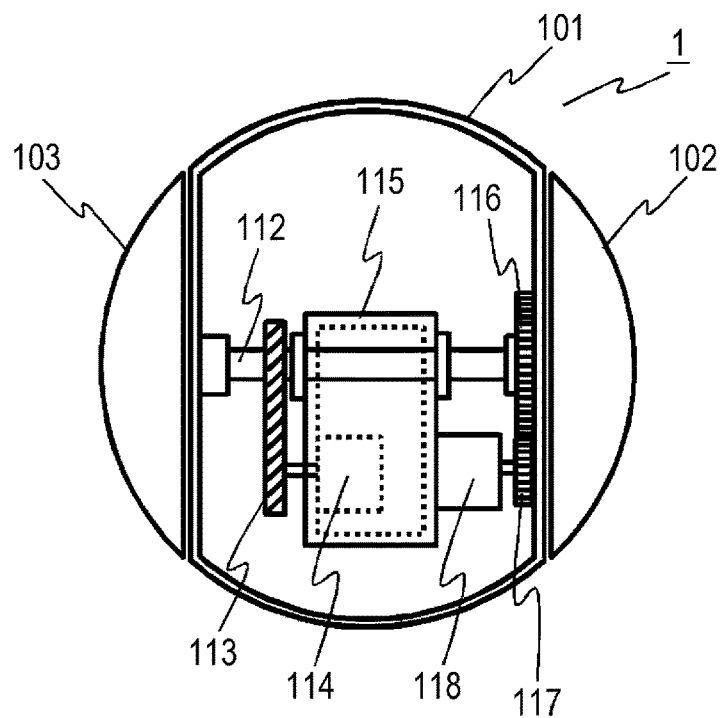
FIG. 3 is a diagram illustrating a first driving mechanism that rotates a first spherical cap and a second spherical cap of the robot according to the first embodiment of the present disclosure, and a second driving mechanism that rotates a main casing.
Figure 4:
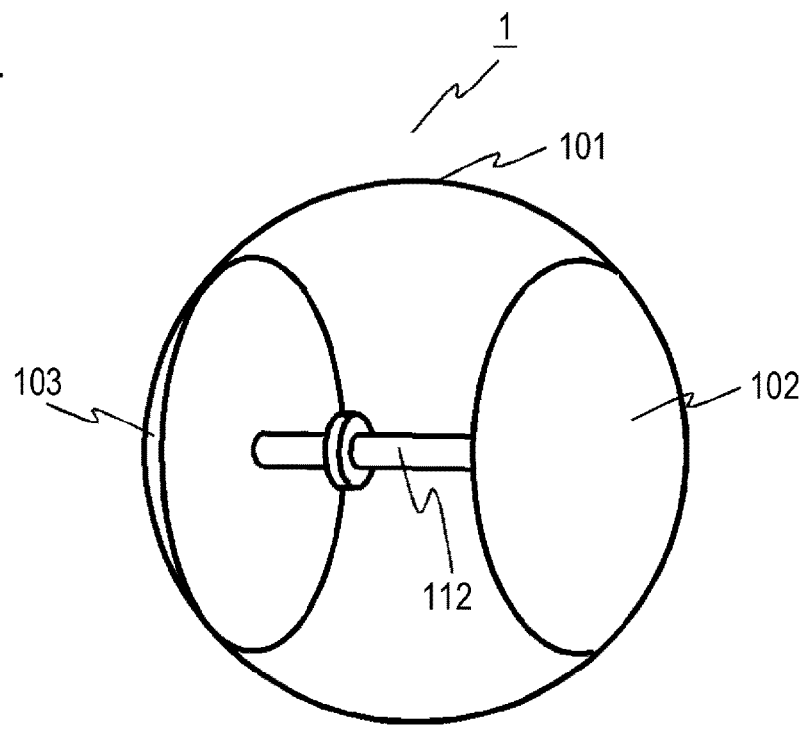
FIG. 4 is an internal perspective view illustrating the linked state of the first spherical cap and the second spherical cap of the robot according to the first embodiment of the present disclosure.
Figure 5:
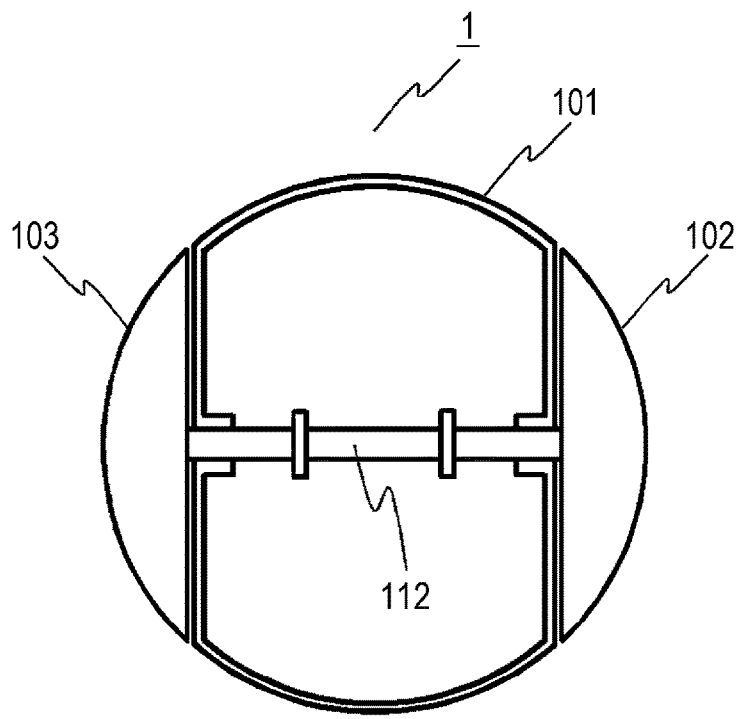
FIG. 5 is an internal front view illustrating the linked state of the first spherical cap and the second spherical cap of the robot according to the first embodiment of the present disclosure.

Next, a first driving mechanism 207 (FIG. 16) that rotates the first spherical cap 102 and second spherical cap 103 will be described with reference to FIGS. 3 through 5. FIG. 3 is a diagram illustrating the first driving mechanism 207 (FIG. 16) that rotates the first spherical cap 102 and second spherical cap 103 of the robot 1 according to the first embodiment of the present disclosure, and a second driving mechanism 209 (FIG. 16) that rotates the main casing 101. FIG. 4 is an internal perspective view illustrating the linked state of the first spherical cap 102 and the second spherical cap 103 of the robot 1 according to the first embodiment of the present disclosure. FIG. 5 is an internal front view illustrating the linked state of the first spherical cap 102 and the second spherical cap 103 of the robot 1 according to the first embodiment of the present disclosure. In FIG. 3, the first driving mechanism 207 (FIG. 16) includes the shaft 112 linking the first spherical cap 102 and second spherical cap 103, a first gear 122 (FIG. 8) attached to the shaft 112, a drive belt 113 attached to the first gear 122 (FIG. 8), a second gear 123 (FIG. 8) that transmits motive power to the drive belt 113, a first motor 114 linked to the second gear 123 (FIG. 8), and a frame 115 that fixes the first motor 114.

The first spherical cap 102 and second spherical cap 103 are linked by the shaft 112 in FIGS. 4 and 5. On the other hand, the shaft 112 and main casing 101 are not fixed to each other in FIG. 5. Accordingly, when the shaft 112 is rotated, the first spherical cap 102 and second spherical cap 103 linked to the shaft 112 rotate in conjunction with the shaft 112, but the main casing 101 does not rotate. Also, the fixing metal plate 108 (FIG. 2) is attached to the shaft 112 via the first arm 109 (FIG. 2) and second arm 110 (FIG. 8), as described above. Accordingly, rotation of the shaft 112, which is to say rotation of the first spherical cap 102 and second spherical cap 103, causes the first display unit 105, second display unit 106, and third display unit 107 that are attached to the fixing metal plate 108 to also rotate along with the first spherical cap 102 and second spherical cap 103. Details of the operations of the first driving mechanism 207 (FIG. 16) will be described later with reference to FIGS. 8 through 10.

Next, the second driving mechanism 209 (FIG. 16) that is independent from the first driving mechanism 207 (FIG. 16) that rotates the main casing 101 will be described with reference to FIG. 3. In FIG. 3, the second driving mechanism 209 (FIG. 16) has a third gear 116 fixed to the main casing 101, a fourth gear 117 that meshes with the third gear 116, a second motor 118 linked to the fourth gear 117, and the frame 115 to which the second motor 118 is fixed. Note that in the present embodiment, the center of the third gear 116 and the center of the shaft 112 match. Details of operations of the second driving mechanism 209 (FIG. 16) will be described later with reference to FIGS. 11 and 12.

Figure 6:
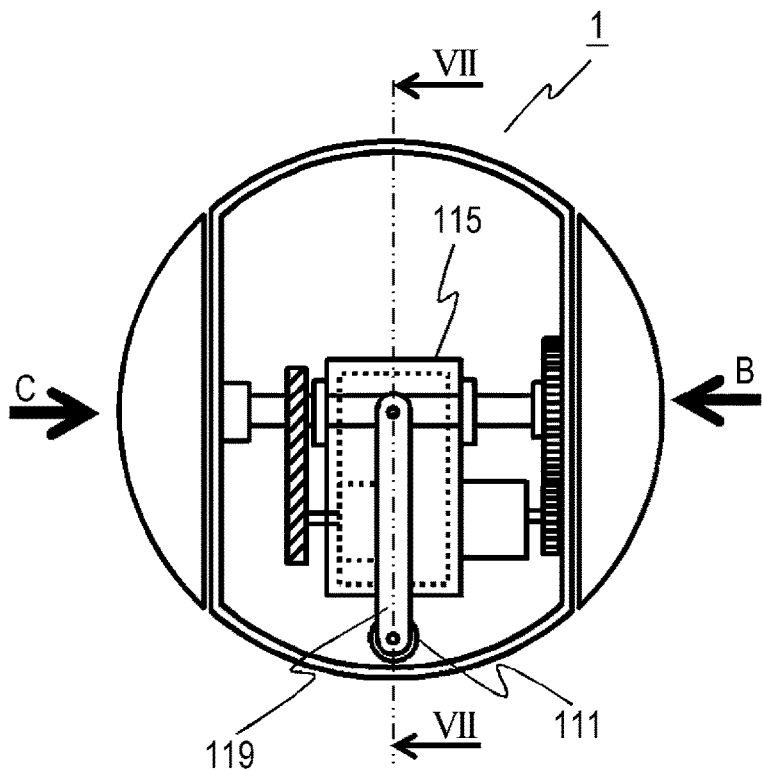
FIG. 6 is a diagram illustrating a driving mechanism for a weight of the robot according to the first embodiment of the present disclosure.
Figure 7:
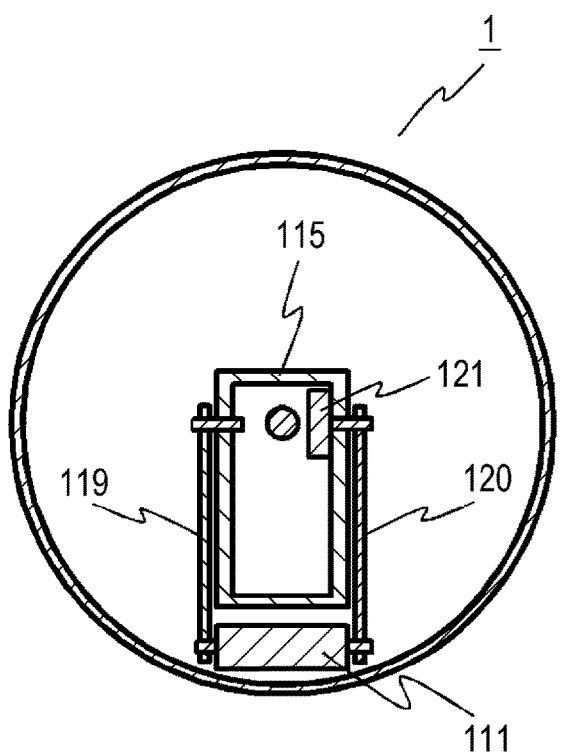
FIG. 7 is a cross-sectional diagram of the robot according to the first embodiment of the present disclosure, taken along line VII-VII in FIG. 6.

Next, the weight driving mechanism 211 (FIG. 16) will be described with reference to FIGS. 6 and 7. FIG. 6 is a diagram illustrating the weight driving mechanism 211 (FIG. 16) of the robot 1 according to the first embodiment of the present disclosure. FIG. 7 is a cross-sectional diagram of the robot 1 according to the first embodiment of the present disclosure, taken along line VII-VII in FIG. 6. It can be seen from FIGS. 6 and 7 that the weight driving mechanism 211 (FIG. 16) has a third arm 119 that supports one end of the weight 111, a fourth arm 120 that supports the other end of the weight 111, and a third motor 121 linked to the fourth arm 120. Note that in the present embodiment, the weight driving mechanism 211 (FIG. 16) is attached in a state rotatable as to the frame 115. Accordingly, driving the third motor 121 does not rotate the frame 115 along there-with. Details of operations of the weight driving mechanism 211 (FIG. 16) will be described later with reference to FIGS. 13 through 15.

Figure 16:
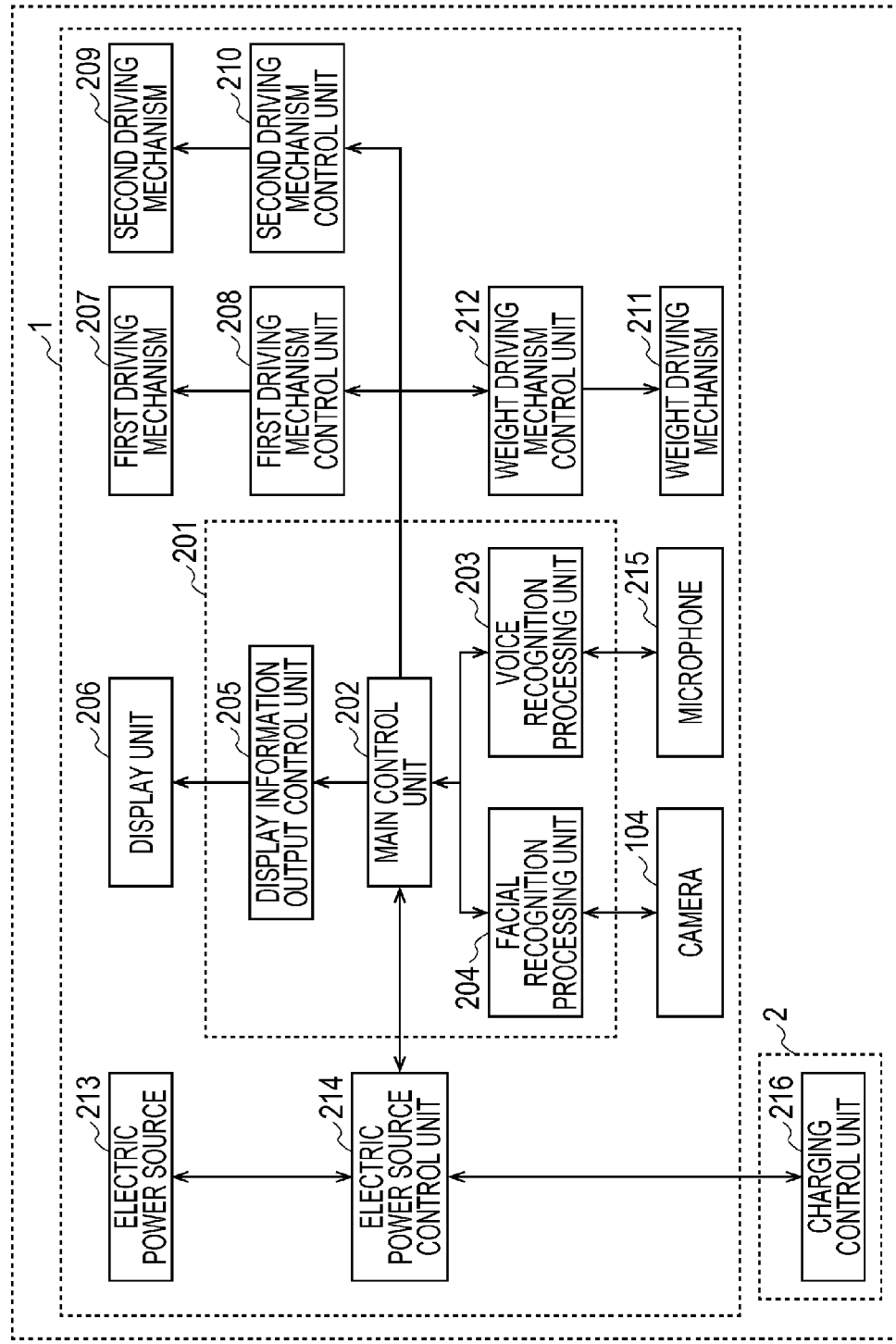
FIG. 16 is a block diagram illustrating the robot according to the first embodiment of the present disclosure and a charger used for charging the robot.

Although omitted from illustration in FIG. 2, the robot 1 further has a control circuit 201 (FIG. 16), an electric power source 213 and a microphone 215 (FIG. 16). The control circuit 201 controls the operations of the robot 1. Details of the control circuit 201 will be described later with reference to FIG. 16.

The robot 1 is charged by a charger 2 (FIG. 16). The electric power source 213 (FIG. 16) manages electric power stored under control by an electric power source control unit 214 (FIG. 16) and a charging control unit 216 (FIG. 16) for the charger 2 of the robot 1. The microphone 215 (FIG. 16) acquires audio in the environment around the robot 1.

Figure 9:
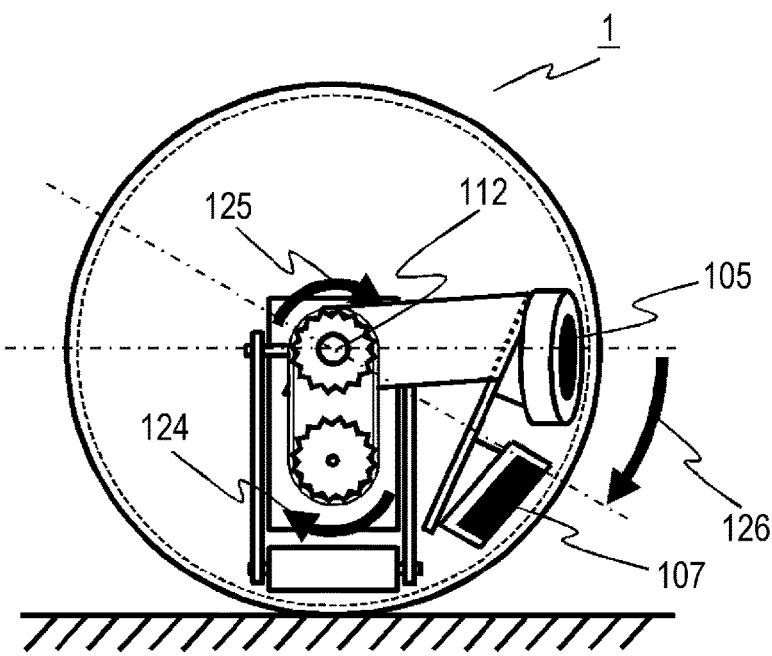
FIG. 9 is a side view illustrating forward-tilted state of a first display unit, a second display unit, and a third display unit, of the robot according to the first embodiment of the present disclosure, as viewed from direction C in FIG. 6.
Figure 10:
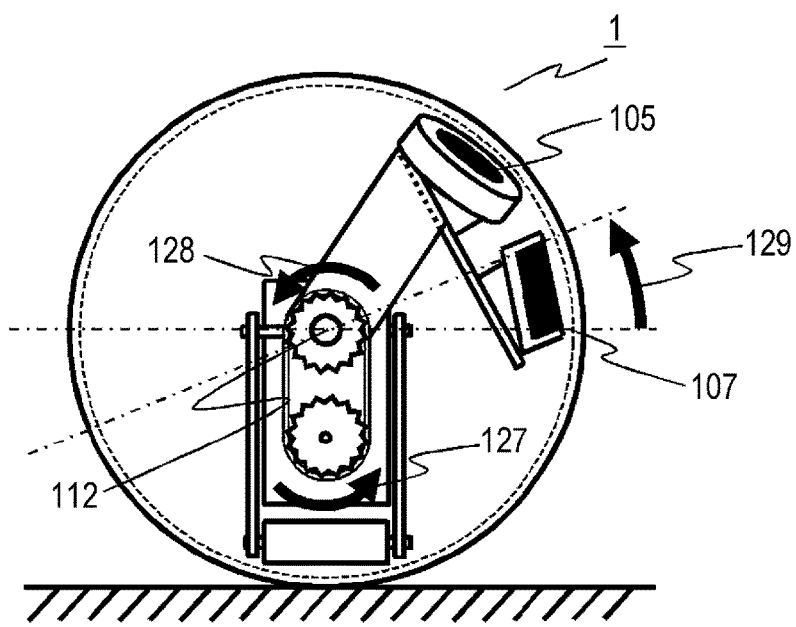
FIG. 10 is a side view illustrating backward-tilted state of the first display unit, second display unit, and third display unit, of the robot according to the first embodiment of the present disclosure, as viewed from direction C in FIG. 6.

Next, details of operations of the first driving mechanism 207 (FIG. 16) will be described with reference to FIGS. 8 through 10. FIG. 8 is a side view illustrating the first driving mechanism 207 (FIG. 16) of the robot 1 according to the first embodiment of the present disclosure, as viewed from direction C in FIG. 6. FIG. 9 is a side view illustrating forward-tilted state of the first display unit 105, second display unit 106, and third display unit 107, of the robot 1 according to the first embodiment of the present disclosure, as viewed from direction C in FIG. 6. FIG. 10 is a side view illustrating backward-tilted state of the first display unit 105, second display unit 106, and third display unit 107, of the robot 1 according to the first embodiment of the present disclosure, as viewed from direction C in FIG. 6.

In FIG. 8, the first display unit 105, second display unit 106, and third display unit 107 face front ahead of the robot 1 in a default position. Driving the first motor 114 (FIG. 3) rotates the second gear 123 linked to the first motor 114. This motive power is transmitted to the first gear 122 via the drive belt 113, and the shaft 112 to which the first gear 122 is fixed rotates in conjunction with the driving of the first motor 114. Now, the fixing metal plate 108 is attached to the shaft 112 via the first arm 109 (FIG. 2) and the second arm 110, as described above. The first spherical cap 102 and second spherical cap 103 are linked by the shaft 112 (FIGS. 4 and 5). Accordingly, the first display unit 105, second display unit 106, and third display unit 107 attached to the fixing metal plate 108 rotate in conjunction with the shaft 112, due to the rotation of the shaft 112, i.e., the rotation of the first spherical cap 102 (FIG. 5) and second spherical cap 103 (FIG. 5).

Rotating the shaft 112 in the direction indicated by arrow 124 and arrow 125 from the default position in FIG. 9 tilts the first display unit 105, second display unit 106 (FIG. 2), and third display unit 107 forward, as indicated by arrow 126. On the other hand, rotating the shaft 112 in the direction indicated by arrow 127 and arrow 128 from the default position in FIG. 10 tilts the first display unit 105, second display unit 106 (FIG. 2), and third display unit 107 backward, as indicated by arrow 129.

As described above, the robot 1 can tilt the first display unit 105, second display unit 106, and third display unit 107 in either direction of forward and backward, by switching the rotation direction of the shaft 112 at the first driving mechanism 207, i.e., the rotation direction of the first spherical cap 102 and the second spherical cap 103. Accordingly, switching the rotation direction of the first spherical cap 102 and second spherical cap 103 causes the first display unit 105, second display unit 106, and third display unit 107 to reciprocally move forward as indicated by arrow 126 and backward as indicated by arrow 129. That is to say, the first display unit 105, second display unit 106, and third display unit 107 reciprocally move in the vertical direction.

As described above, the first display unit 105, second display unit 106, and third display unit 107 represent part of the face of the robot 1, such as eyes and mouth, for example. Accordingly, reciprocally moving the first display unit 105, second display unit 106, and third display unit 107 in the vertical direction by switching the rotation direction of the first spherical cap 102 and second spherical cap 103 enables a state of the robot 1 being out of breath or a state of being sleepy to be expressed. By performing this control in a case where the remaining electric power of the electric power source 213 is at a predetermined level or lower enables the user to be naturally notified that the remaining electric power of the electric power source 213 is low, without displaying information related to remaining electric power, which is unrelated to the face, on the first display unit 105, second display unit 106, and third display unit 107.

Figure 11:
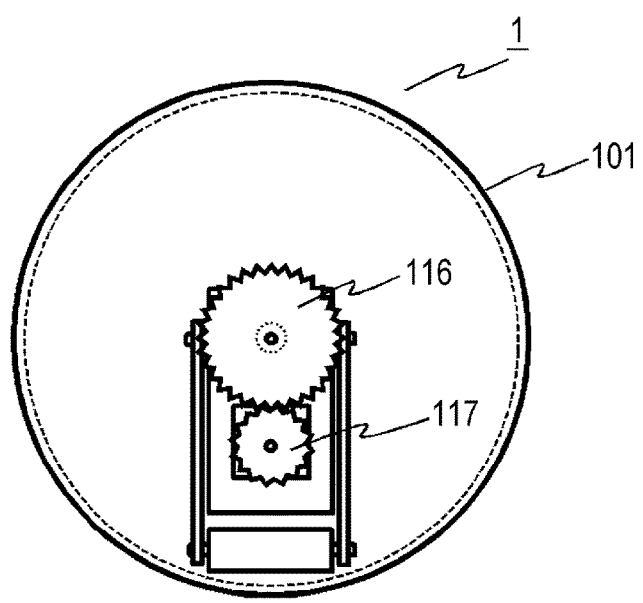
FIG. 11 is a side view illustrating the second driving mechanism of the robot according to the first embodiment of the present disclosure, as viewed from direction B in FIG. 6.
Figure 12:
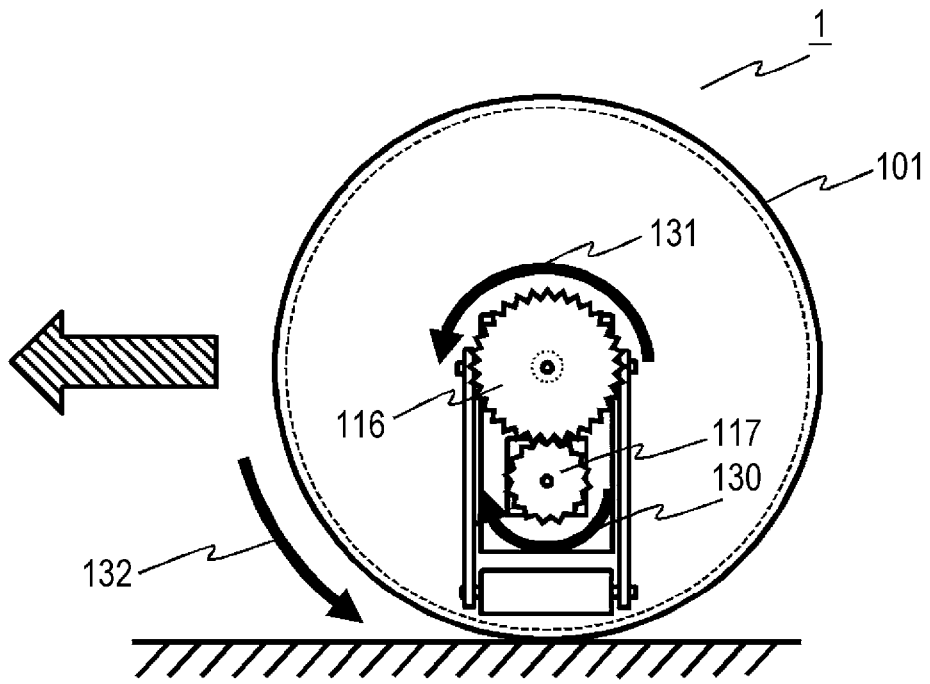
FIG. 12 is a side view illustrating advancing operations of the robot according to the first embodiment of the present disclosure, as viewed from direction B in FIG. 6.

Next, details of the operations of the second driving mechanism 209 (FIG. 16) will be described with reference to FIGS. 11 and 12. FIG. 11 is a side view illustrating the second driving mechanism 209 (FIG. 16) of the robot 1 according to the first embodiment of the present disclosure, as viewed from direction B in FIG. 6. FIG. 12 is a side view illustrating the advancing operations of the robot 1 according to the first embodiment of the present disclosure, as viewed from direction B in FIG. 6.

In FIG. 11, driving the second motor 118 (FIG. 3) rotates the fourth gear 117 linked to the second motor 118. This motive power is then transmitted to the third gear 116 that meshes with the fourth gear 117. Accordingly, the main casing 101 to which the third gear 116 is fixed rotates in conjunction with the driving of the second motor 118.

Rotating the second motor 118 (FIG. 3) in the direction of arrow 130 causes the third gear 116 that meshes with the fourth gear 117 to rotate in the direction of arrow 131, as illustrated in FIG. 12. The main casing 101 to which the third gear 116 is fixed thus rotates in the direction of arrow 132. Accordingly, the robot 1 advances. Rotating the second motor 118 in the opposite direction from the arrow 130 causes the robot 1 to retreat. Thus, the robot 1 can move in either of the forward and backward directions, by switching the rotational direction of the second motor 118 at the second driving mechanism 209 (FIG. 16).

Figure 13:
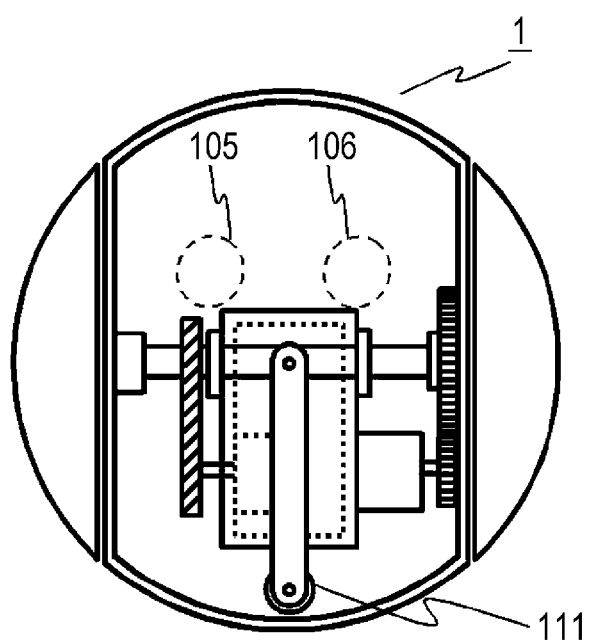
FIG. 13 is a front view illustrating the attitude of the robot according to the first embodiment of the present disclosure when the weight of the robot is situated at the middle, as viewed from direction A in FIG. 2.
Figure 14:
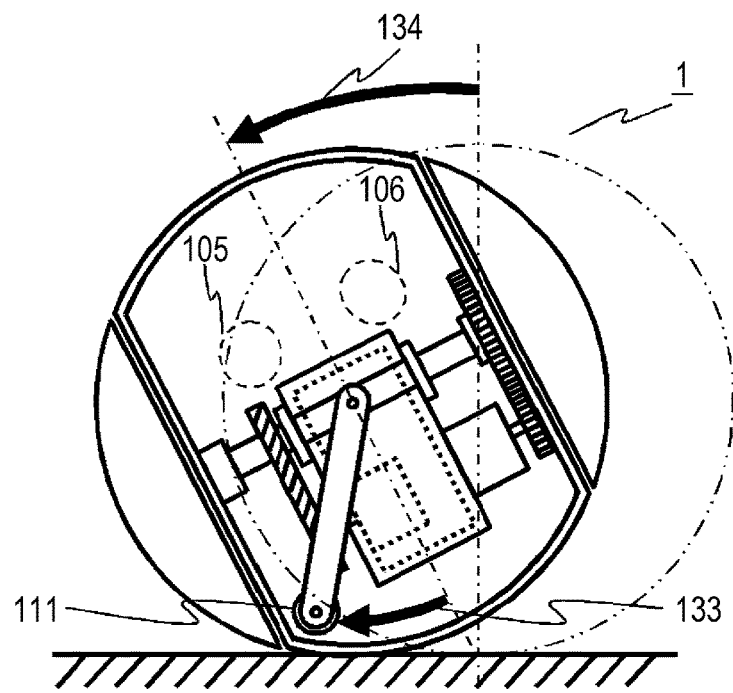
FIG. 14 is a front view illustrating the attitude of the robot according to the first embodiment of the present disclosure when the weight of the robot is situated toward the left, as viewed from direction A in FIG. 2.
Figure 15:
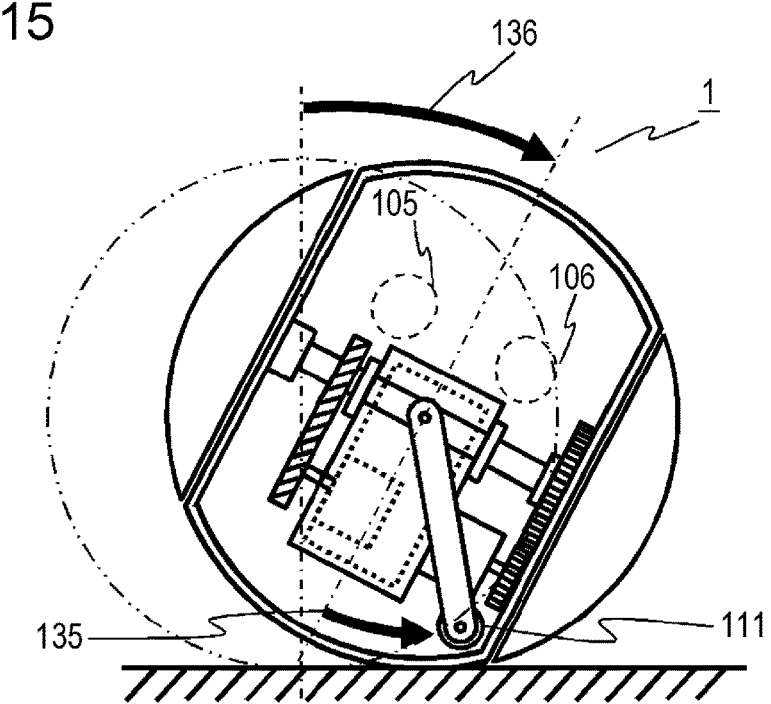
FIG. 15 is a front view illustrating the attitude of the robot according to the first embodiment of the present disclosure when the weight of the robot is situated toward the right, as viewed from direction A in FIG. 2.

Next, details of operations of the weight driving mechanism 211 (FIG. 16) will be described with reference to FIGS. 13 through 15. FIG. 13 is a front view illustrating the attitude of the robot 1 according to the first embodiment of the present disclosure when the weight 111 of the robot 1 is situated at the middle, as viewed from direction A in FIG. 2. FIG. 14 is a front view illustrating the attitude of the robot 1 according to the first embodiment of the present disclosure when the weight 111 of the robot 1 is situated toward the left, as viewed from direction A in FIG. 2. FIG. 15 is a front view illustrating the attitude of the robot 1 according to the first embodiment of the present disclosure when the weight 111 of the robot 1 is situated toward the right, as viewed from direction A in FIG. 2.

When the weight 111 is situated at the middle, the first display unit 105, second display unit 106, and third display unit 107 (FIG. 2) are not tilted, as illustrated in FIG. 13. As illustrated in FIG. 14, when the weight 111 is moved from the middle position toward the left direction indicated by arrow 133, by driving the third motor 121 (FIG. 7), the first display unit 105, second display unit 106, and third display unit 107 (FIG. 2) are tilted to the left as indicated by arrow 134. When the weight 111 is moved from the middle position toward the right direction indicated by arrow 135 as illustrated in FIG. 15, by driving the third motor 121 (FIG. 7) in the opposite direction, the first display unit 105, second display unit 106, and third display unit 107 (FIG. 2) are tilted to the right as indicated by arrow 136.

Accordingly, the first display unit 105, second display unit 106, and third display unit 107 can be tilted in either of the left and right directions, by switching the rotational direction of the third motor 121 at the weight driving mechanism 211. Thus, switching the rotational direction of the third motor 121 causes the robot 1 to perform reciprocal movements of tilting to the left as indicated by arrow 134 and tilting to the right as indicated by arrow 136. That is to say, the robot 1 rotates to the left and right directions at a predetermined angle.

The first display unit 105, second display unit 106, and third display unit 107 represent part of the face of the robot 1, such as eyes and mouth, for example, as described above. Accordingly, causing the robot 1 to perform reciprocal motion of tilting to the right and to the left using the weight 111 can express that the robot 1 is in a good mood or that the robot 1 is in thought.

Now, a method of changing the direction in which the robot 1 is traveling by using the weight 111 will be described. In the present embodiment, the second driving mechanism 209 that rotates the main casing 101 alone can only serve to cause the main casing 101 to travel forward or backward with regard to the direction of travel. Accordingly, the second driving mechanism 209 alone cannot switch the traveling direction of the main casing 101 toward the right or toward the left. Thus, the robot 1 uses the weight 111 to switch the traveling direction of the main casing 101 toward the right or toward the left. That is to say, the robot 1 changes directions by combining forward advance operations or reverse advance operations by the second driving mechanism 209 and operations of tilting the robot 1 to the left or to the right by the weight driving mechanism 211. More specifically, when the weight driving mechanism 211 moves the weight 111 from the middle position (FIG. 13) to the left (FIG. 14) or to the right (FIG. 15), the center of gravity of the robot 1 is shifted away from the middle position. Performing advancing operations by the above-described second driving mechanism 209 in this state causes the robot 1 to move straight ahead and gradually advance while following an arc in the direction to which the weight 111 has been moved. That is to say, the robot 1 can change directions by advancing while curving to the left or to the right. Thus, the weight driving mechanism 211 is also used to change directions of the robot 1.

Next, the details of inner circuits of the robot 1 according to the first embodiment of the present disclosure will be described with reference to FIG. 16. FIG. 16 is a block diagram illustrating the robot 1 according to the first embodiment of the present disclosure and the charger 2 used for charging the robot 1. As illustrated in FIG. 16, the robot 1 includes the control circuit 201, a display unit 206, the first driving mechanism 207, a first driving mechanism control unit 208, the second driving mechanism 209, a second driving mechanism control unit 210, the weight driving mechanism 211, a weight driving mechanism control unit 212, the electric power source 213, the electric power source control unit 214, the camera 104, and the microphone 215. The charger 2 also has the charging control unit 216.

The control circuit 201 has a main control unit 202, a voice recognition processing unit 203, a facial recognition processing unit 204, and a display information output control unit 205. The main control unit 202 acquires recognition results of the voice of the user from the voice recognition processing unit 203. The main control unit 202 acquires recognition results of the face of the user from the facial recognition processing unit 204. The main control unit 202 acquires a charging flag and remaining charge regarding the electric power state of the electric power source 213 from the electric power source control unit 214.

The main control unit 202 generates commands based on information acquired from the voice recognition processing unit 203, facial recognition processing unit 204, and electric power source control unit 214, and transmits various types of commands to the display information output control unit 205, first driving mechanism control unit 208, second driving mechanism control unit 210, and weight driving mechanism control unit 212. Details of the commands will be described later.

The voice recognition processing unit 203 recognizes whether the voice of the user is present or not from the audio acquired by the microphone 215, and manages the voice recognition results. The facial recognition processing unit 204 recognizes whether the face of the user is present or not, and the position and size, from the video acquired by the camera 104, and manages the facial recognition results.

The display information output control unit 205 displays expression display information of the robot 1 on the display unit 206, in accordance with commands transmitted from the main control unit 202. The display unit 206 is made up of the first display unit 105, second display unit 106, and third display unit 107 described in FIG. 2.

The first driving mechanism control unit 208 causes the first driving mechanism 207 of the robot 1 to operate, in accordance with commands transmitted from the main control unit 202. The first driving mechanism 207 is made up of the shaft 112 described in FIG. 3 that links the first spherical cap 102 and second spherical cap 103, the first gear 122 (FIG. 8) attached to the shaft 112, the drive belt 113 attached to the first gear 122 (FIG. 8), the second gear 123 (FIG. 8) that transmits motive power to the drive belt 113, the first motor 114 linked to the second gear 123 (FIG. 8), and the frame 115 that fixes the first motor 114.

The second driving mechanism control unit 210 causes the second driving mechanism 209 of the robot 1 to operate, in accordance with commands transmitted from the main control unit 202. The second driving mechanism 209 is made up of the third gear 116 described in FIG. 3 fixed to the main casing 101, the fourth gear 117 that meshes with the third gear 116, the second motor 118 linked to the fourth gear 117, and the frame 115 that fixes the second motor 118.

The weight driving mechanism control unit 212 causes the weight driving mechanism 211 of the robot 1 to operate, in accordance with commands transmitted from the main control unit 202. The weight driving mechanism 211 is made up of the third arm 119 that supports one end of the weight 111 described in FIGS. 6 and 7, the fourth arm 120 that supports the other end of the weight 111, and the third motor 121 linked to the fourth arm 120.

The electric power source control unit 214 manages the charging flag that indicates whether or not the electric power state of the robot 1 is being charged, and the amount of remaining electric power. The electric power source control unit 214 outputs information of the charging flag and the amount of remaining electric power to the main control unit 202. Further, in a case where the robot 1 is connected to the charger 2, the electric power source control unit 214 stores electric power in the electric power source 213 of the robot 1 along with the charging control unit 216 of the charger 2. In a case where the amount of remaining electric power of the electric power source 213 is a predetermined value or lower, the main control unit 202 performs the following remaining electric power notification processing.

Figure 17:
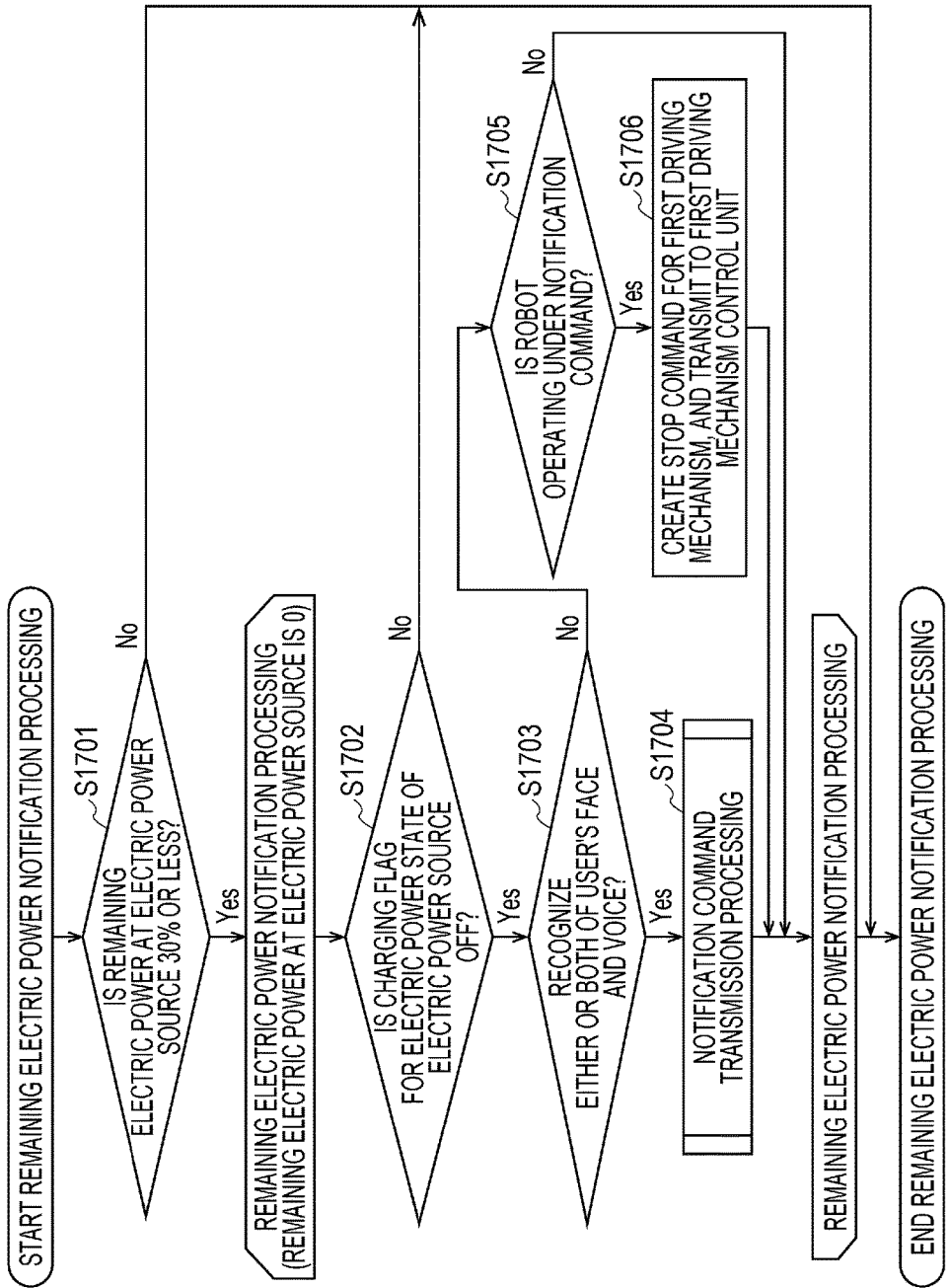
FIG. 17 is a flowchart illustrating remaining electric power notification processing of the robot according to the first embodiment of the present disclosure.

Next, remaining electric power notification processing in the robot 1 according to the first embodiment of the present disclosure will be described with reference to FIG. 17. FIG. 17 is a flowchart illustrating remaining electric power notification processing of the robot 1 according to the first embodiment of the present disclosure. In a case where the amount of remaining electric power in the electric power source 213 within the robot 1 reaches a predetermined value or lower, the first driving mechanism control unit 208 performs processing of switching the rotation direction of the first spherical cap 102 and second spherical cap 103 to reciprocally move the display unit 206 in the vertical direction, thereby expressing a state of the robot 1 being out of breath or a state of being sleepy.

First, the electric power source control unit 214 periodically monitors the amount of remaining electric power in the electric power source 213. The main control unit 202 inputs information of the amount of remaining electric power from the electric power source control unit 214, and determines whether the amount of remaining electric power of the electric power source 213 is at or lower 30%, for example (S1701). In a case where the amount of remaining electric power of the electric power source 213 is not at or lower 30% (case of "No" in S1701), the remaining electric power notification processing ends. The reason is that the amount of remaining electric power in the electric power source 213 is not low yet, so notifying the user of the amount of remaining electric power in the electric power source 213 is unnecessary.

In a case where the amount of remaining electric power of the electric power source 213 is at or lower 30%, for example (case of "Yes" in S1701), the loop processing from S1702 through S1706, i.e., remaining electric power notification processing, is repeated until the amount of remaining electric power of the electric power source 213 reaches 0. Here, "remaining electric power notification processing" indicates the processing of the robot 1 switching the rotation in the vertical direction, thereby expressing a state of the robot 1 being out of breath or a state of being sleepy. The reason that this processing is performed is to prevent a state where, in a case where the amount of remaining electric power of the electric power source 213 is low and the robot 1 does not move any more, the user cannot distinguish whether the robot 1 is not moving because the charge has been spent, or is not moving due to a malfunction. Although the predetermined value at which the amount of remaining electric power of the electric power source 213 is the predetermined value or lower has been exemplarily illustrated as 30% for example, this is not restrictive.

In the remaining electric power notification processing, the main control unit 202 determines whether or not the electric power state of the robot 1 is charging or not, based on whether the charging flag input from the electric power source control unit 214 is ON or OFF (S1702).

In a case where the charging flag of the electric power state of the robot 1 is not OFF (case of "No" in S1702), i.e., in a case where the charging flag is ON, the remaining electric power notification processing ends. In the present embodiment, the robot 1 is charging, so the user is not notified of the amount of remaining electric power of the electric power source 213.

In a case where the charging flag of the electric power state of the robot 1 is OFF (case of "Yes" in S1702), the robot 1 determines whether one of both of the face and voice of the user is recognized (S1703). The reason is that the charging state of the robot 1 is meaningful information only when notified to the user. In a case where the user is not around the robot 1, even if the robot 1 expresses a state of being out of breath or a state of being sleepy, this needlessly consumes remaining electric power in a state where the amount of remaining electric power is low if the user is not around the robot 1 to confirm that expression. Accordingly, the robot 1 confirms that the user is nearby, and notifies the charging state of the robot 1 to the user in the present embodiment. Accordingly, in a case where the amount of remaining electric power of the electric power source 213 is 30% or lower, a situation where the robot 1 expresses a state of being out of breath or a state of being sleepy without the user to be notified being around the robot 1, thereby needlessly consuming electric power, can be prevented.

In a case where the robot 1 has not recognized either or both of the face and voice of the user (case of "No" in S1703), the main control unit 202 determines whether or not the robot 1 is currently being operated under a notification command that the main control unit 202 has output to the first driving mechanism control unit 208 or the second driving mechanism control unit 210 (S1705). This is because if the user is not around the robot 1, the rotational direction of the first spherical cap 102 and second spherical cap 103 being switched to reciprocally move the display unit 206 in the vertical direction will even further reduce the already-low amount of remaining electric power of the electric power source 213, so the movement of the robot 1 is stopped to keep electric power from being needlessly consumed. The notification command will be described later in the description of FIG. 18.

In a case where the robot 1 is not currently being operated under a notification command that the main control unit 202 has transmitted (case of "No" in S1705), the robot 1 is already in a stopped state, so no processing is performed in particular. Thereafter, the remaining electric power notification processing from S1702 through S1706 is repeated every predetermined amount of time.

On the other hand, in a case where the robot 1 is currently being operated under a notification command that the main control unit 202 has output to the first driving mechanism control unit 208 or the second driving mechanism control unit 210 (case of "Yes" in S1705), the main control unit 202 creates a stop command for the first driving mechanism 207, and outputs the stop command to the first driving mechanism control unit 208 (S1706). A conceivable case would be, for example, a situation where the user originally was around the robot 1 and the first driving mechanism control unit 208 was switching the rotational direction of the first spherical cap 102 and second spherical cap 103 to reciprocally move the display unit 206 in the vertical direction to appeal to the user that the amount of remaining electric power of the electric power source 213 is low, but while the remaining electric power notification processing was being repeated for a certain amount of time, the user left the side of the robot 1.

The robot 1 stops actions in S1706. Accordingly, in a case where the amount of remaining electric power of the electric power source 213 is 30% or less, a situation where the rotational direction of the first spherical cap 102 and second spherical cap 103 is switched to reciprocally move the display unit 206 in the vertical direction and electric power being needlessly consumed, even though there is no user to be notified around the robot 1, can be prevented.

After S1706, the remaining electric power notification processing from S1702 through S1706 is repeated every predetermined amount of time.

In S1703, in a case where the robot 1 has recognized either or both of the face and voice of the user (case of "Yes"), the main control unit 202 performs notification command transmission processing (S1704). Details of notification command transmission processing will be described later with reference to FIG. 18.

As a result of the notification command transmission processing in S1704, the first driving mechanism control unit 208 switches the rotational direction of the first spherical cap 102 and second spherical cap 103 to reciprocally move the display unit 206 in the vertical direction. That is to say, the robot 1 being in a state of being out of breath or a state of being sleepy is expressed. In this case, the display unit 206 displays a part of the face of the robot 1, such as eyes or mouth, for example. Accordingly, the state of the electric power source 213 can be indicated to the user by reciprocally moving the display unit 206 in the vertical direction without displaying a display indicating the amount of remaining electric power of the electric power source 213 on the surface of the spherical robot 1, even though the robot 1 is spherical and has no arms or legs, for example.

After S1704, the remaining electric power notification processing from S1702 through S1706 is repeated every predetermined amount of time.

Figure 18:
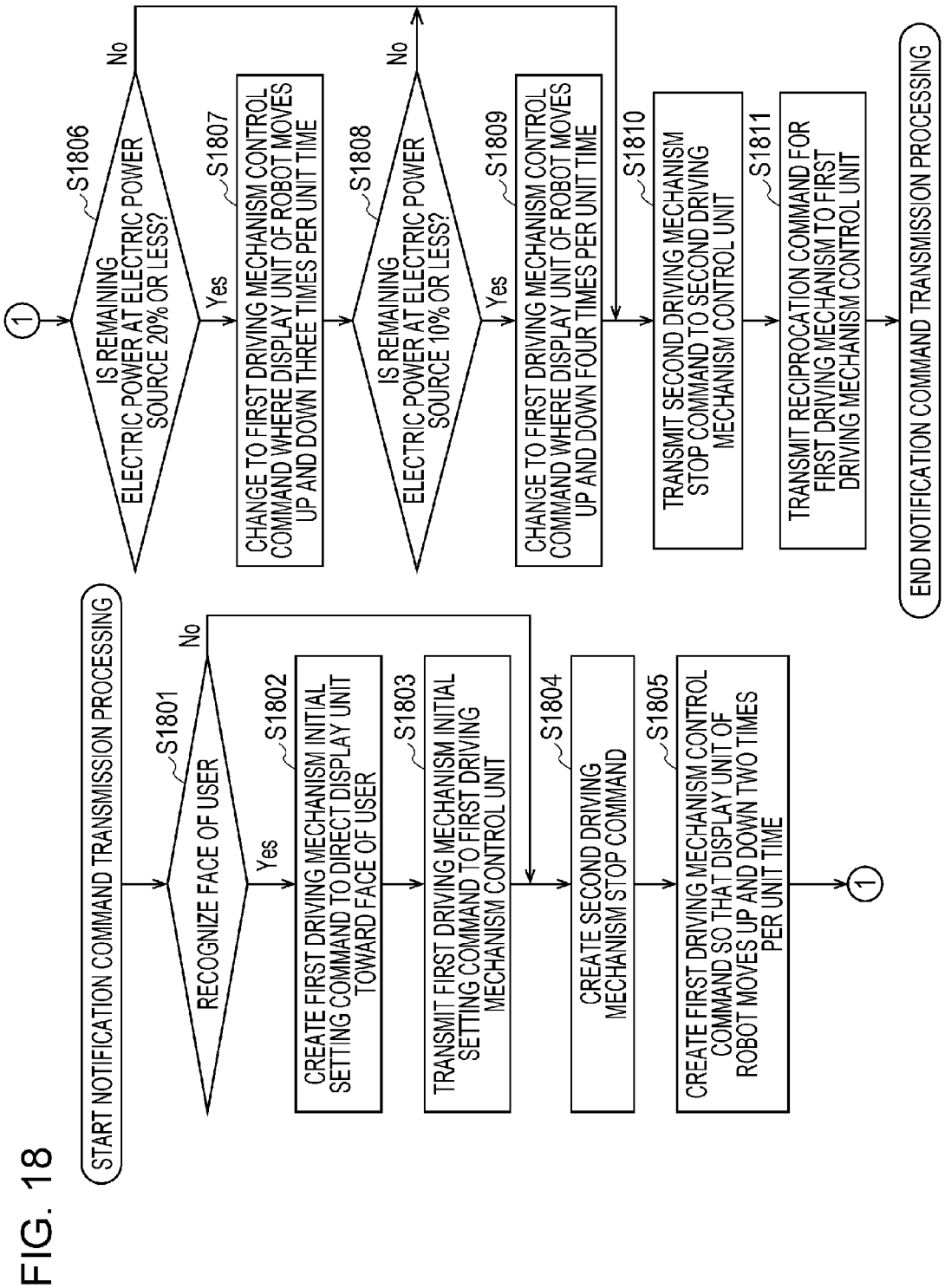
FIG. 18 is a flowchart illustrating notification command transmission processing of the robot according to the first embodiment of the present disclosure.

Next, details of notification command transmission processing in S1704 in FIG. 17 will be described with reference to FIG. 18. FIG. 18 is a flowchart illustrating notification command transmission processing of the robot 1 according to the first embodiment of the present disclosure.

Determination is made in the notification command transmission processing regarding whether or not the amount of remaining electric power of the electric power source 213 is 30% or lower, 20% or lower, or 10% or lower, for example, which will be described later, and the number of times that the display unit 206 reciprocally moves in the vertical direction is increased in accordance with these determination results. Accordingly, the lower the amount of remaining electric power of the electric power source 213 is, a state of the robot 1 being more out of breath or a state of being sleepier is expressed.

First, the main control unit 202 inputs the results of facial recognition of the user from the facial recognition processing unit 204, and confirms whether the face of the user can be recognized (S1801).

Next, in a case where the main control unit 202 can recognize the face of the user (case of "Yes" in S1801), the main control unit 202 creates an initial setting command for initial setting of the first driving mechanism 207, to direct the display unit 206 toward the face of the user (S1802). The main control unit 202 then transmits the initial setting command to the first driving mechanism control unit 208 (S1803).

Accordingly, the first driving mechanism control unit 208 drives the first driving mechanism 207 based on the initial setting command. That is to say, the robot 1 performs an action of directing the display unit 206 toward the face of the user, and stops in a state where the face of the robot 1 is facing the user. Accordingly, the robot 1 performs the reciprocal movement in the vertical direction with the face of the robot 1 directed toward the user, and thus can express an action of appealing to the user of a state where the robot 1 is out of breath or a state of being sleepy.

Although an initial setting command for the first driving mechanism 207 was created in S1802, to direct the display unit 206 toward the face of the user, this is not restrictive. An initial setting command may be created to direct the display unit 206 to a position lower than the face of the user.

In this case, the robot 1 stops in a state that appears to be looking down when the user views the robot 1, expressing a state where the robot 1 is out of breath or a state of being sleepy. Thus, the robot 1 presents the user with a more tired state by looking down.

On the other hand, in a case where the main control unit 202 cannot recognize the face of the user in S1801 (case of "No"), the main control unit 202 does not recognize that the image taken by the camera 104 is the face of the user, but recognizes that the sound collected by the microphone 215 is the voice of the user ("Yes" in S1703 in FIG. 17). Accordingly, determination can be made that the user is around the robot 1. An example is a case where the user is behind the robot 1. In this case, the robot 1 does not need to perform the processing of directing the face of the robot 1 toward the user, so the display unit 206 is reciprocally moved in the vertical direction without performing the processing in the above-described S1802 and S1803.

Following S1803, or after a determination of "No" is made in S1801, the main control unit 202 creates a stop command for the second driving mechanism 209 (S1804). Accordingly, in the present embodiment, the rotation of the main casing 101 of the robot 1 is stopped before reciprocally moving the display unit 206 in the vertical direction. This is because reciprocally moving the display unit 206 in the vertical direction in a stopped state conceivably will give the appearance of the robot 1 being in a state out of breath or a state of being sleepy.

The main control unit 202 creates a reciprocation command for the display unit 206 to move up and down two times, for example, per unit time (S1805). The reason is to distinguish expressing the robot 1 being in a state out of breath or a state of being sleepy from an action of nodding in response to a question from the user, simply by the action of reciprocally moving the display unit 206 in the vertical direction. Specifically, when nodding in response to a question from the user, an action of the robot 1 moving the face vertically one time is common. Accordingly, in the present embodiment, the rotational direction of the first spherical cap 102 and the second spherical cap 103 is switched to reciprocally move the display unit 206 in the vertical direction, as an action to notify the user that the amount for remaining electric power of the electric power source 213 is low.

Accordingly, a case of expressing the robot 1 being in a state out of breath or a state of being sleepy can be easily distinguished from an action of nodding in response to a question from the user, simply by the action of reciprocally moving the display unit 206 in the vertical direction. As a result, the user can be notified that the amount of remaining electric power of the electric lower source 213 is low in a sure manner.

Next, the main control unit 202 inputs information of amount of remaining electric power from the electric power source control unit 214, and determines whether the amount of remaining electric power of the electric power source 213 is 20% or lower, for example (S1806).

Determination of whether the amount of remaining electric power of the electric power source 213 is 30% or lower was made in S1701 in FIG. 17, as conditions to commence the remaining electric power notification processing. Once the remaining electric power notification processing commences, the operations of reciprocally moving the display unit 206 in the vertical direction will continue. Thus, the amount of remaining electric power continues to drop even as the operations of reciprocally moving the display unit 206 in the vertical direction are continued. Accordingly, in the present embodiment, the degree of reduction in the amount of remaining electric power of the electric power source 213 is determined again, in order to more emphatically express the state of the robot 1 being out of breath or a state of being sleepy, the lower the amount of remaining electric power of the electric power source 213 is. Although an example of 20% has been described here, it should be noted that this is not restrictive.

An assumption will be made here of a case where the notification command transmission processing is started immediately after the amount of remaining electric power of the electric power source 213 drops below 30%. In this assumption, the amount of remaining electric power of the electric power source 213 is greater than 20% but is 30% or lower, so a determination of "No" is made in S1806. In this case, the main control unit 202 then transmits the stop command created in S1804 to the second driving mechanism control unit 210 (S1810).

Next, the main control unit 202 transmits the reciprocation command created in S1805 to the first driving mechanism control unit 208 (S1811). Thus, the notification command transmission processing ends.

Note that the actions of the robot 1 based on the reciprocation command created in S1805 may be executed before the actions of the robot 1 based on the stop command created in S1804 being performed. That is to say, even in a case where the display unit 206 is reciprocally moved in the vertical direction before the stopped state, the robot 1 may be stopped after this, so that the display unit 206 is reciprocally moved in the vertical direction in a stopped state as a result. Thereafter, the remaining electric power notification processing from S1702 through S1706 in FIG. 17 is performed every predetermined amount of time. The "stop command" created in S1804 and the "reciprocation command" created in S1805 correspond to the "notification command" in S1705 in FIG. 17.

Notification command transmission processing in a case where the amount of remaining electric power of the electric power source 213 is greater than 20% but is 30% or lower has been described so far.

Next, a case where the remaining electric power notification processing from S1702 through S1706 in FIG. 17 has been repeated every predetermined amount of time, the amount of remaining electric power of the electric power source 213 has further dropped, and the amount of remaining electric power of the electric power source 213 is greater than 10% but is 20% or lower, will be described with reference to FIG. 18.

In this case as well, the processing from S1801 to S1805 is the same as the above-described case where the amount of remaining electric power of the electric power source 213 is greater than 20% but is 30% or lower.

In S1806, the amount of remaining electric power of the electric power source 213 is 20% or less, unlike the above-described case, so a determination of "Yes" is made. In this case, the main control unit 202 changes the command created in S1805, i.e., the reciprocation command to move the display unit 206 up and down two times per unit time, to a reciprocation command to move up and down three times, for example (S1807). Although the number of times of moving up and down to be changed to has been described as three times, for example, this is not restrictive.

Following S1807, the main control unit 202 inputs information of the amount of remaining electric power from the electric power source control unit 214, and determines whether the amount of remaining electric power of the electric power source 213 is 10% or lower, for example (S1808). A case where the amount of remaining electric power of the electric power source 213 is greater than 10% but is 20% or lower is assumed, as described above, so a determination of "No" is made in S1808.

Next, the processing of transmitting the stop command to the second driving mechanism control unit 210 (S1810), and the processing of transmitting the reciprocation command to the first driving mechanism control unit 208 (S1811), are performed, in the same way as in the case where the amount of remaining electric power of the electric power source 213 is greater than 20% but is 30% or lower. Thus, the notification command transmission processing ends.

Notification command transmission processing in a case where the amount of remaining electric power of the electric power source 213 is greater than 10% but is 20% or lower has been described so far.

Next, a case where the remaining electric power notification processing from S1702 through S1706 in FIG. 17 has been repeated every predetermined amount of time, the amount of remaining electric power of the electric power source 213 has dropped even further, and the amount of remaining electric power of the electric power source 213 is greater than 0% but is 10% or lower, will be described with reference to FIG. 18.

In this case as well, the processing from S1801 to S1807 is the same as the above-described case where the amount of remaining electric power of the electric power source 213 is greater than 10% but is 20% or lower.

In S1808, the amount of remaining electric power of the electric power source 213 is 10% or less, unlike the above-described case, so a determination of "Yes" is made. In this case, the main control unit 202 changes the command created in S1807, i.e., the reciprocation command to move the display unit 206 up and down three times per unit time, to a reciprocation command to move up and down four times, for example (S1809). Although the number of times of moving up and down to be changed to has been described as four times, for example, this is not restrictive.

Next, the processing of transmitting the stop command to the second driving mechanism control unit 210 (S1810), and the processing of transmitting the reciprocation command to the first driving mechanism control unit 208 (S1811), are performed, in the same way as in the case where the amount of remaining electric power of the electric power source 213 is greater than 10% but is 20% or lower. Thus, the notification command transmission processing ends.

Notification command transmission processing in a case where the amount of remaining electric power of the electric power source 213 is greater than 0% but is 10% or lower has been described so far.

Thus, according to the present embodiment the lower the amount of remaining electric power of the electric power source 213 becomes, the greater the number of times that the display unit 206 is reciprocally moved in the vertical direction per unit time, i.e., the number of times of switching the rotational direction of the first spherical cap 102 and second spherical cap 103, is increased to (S1805, S1807, S1809). Accordingly, the lower the amount of remaining electric power of the electric power source 213 becomes, the more emphatically the robot 1 expresses a state of being out of breath or a state of being sleepy, in stages. Although a case where the number of stages of the amount of remaining electric power for deciding a notification command is three (greater than 20% but 30% or lower, greater than 10% but 20% or lower, and greater than 0% but 10% or lower) has been described as an example, the number of stages is not restricted to this.

As described above, the lower the amount of remaining electric power of the electric power source 213 is, the more times the rotational direction of the first spherical cap 102 and the second spherical cap 103 are switched per time unit, which increases the consumption of the electric power of the electric power source 213 increases. However, in the present embodiment, a strong expression of the state of the robot 1 being out of breath or a state of being sleepy is made even if this means sacrificing the amount of remaining electric power of the electric power source 213, thereby emphatically notifying the user that amount of remaining electric power of the electric power source 213 is low.

Also, according to the present embodiment, the lower the amount of remaining electric power of the electric power source 213 becomes, the greater the number of times that the display unit 206 is reciprocally moved in the vertical direction per unit time is increased to (S1805, S1807, S1809), as described above. Alternatively, an arrangement may be made where the lower the amount of remaining electric power of the electric power source 213 becomes, the greater the amount of movement of the first spherical cap 102 and the second spherical cap 103 becomes due to switching of the rotational direction of the first spherical cap 102 and the second spherical cap 103. In this case as well, the lower the amount of remaining electric power of the electric power source 213 becomes, the sleepier the robot 1 can be expressed as being.

As described above, even a spherical robot with no arms or legs, for example, can appeal that the remaining charge in the electric power source 213 is low, without displaying the display indicating the amount of remaining electric power of the electric power source 213 on the surface of the spherical robot 1.

Second Embodiment

Figure 19:
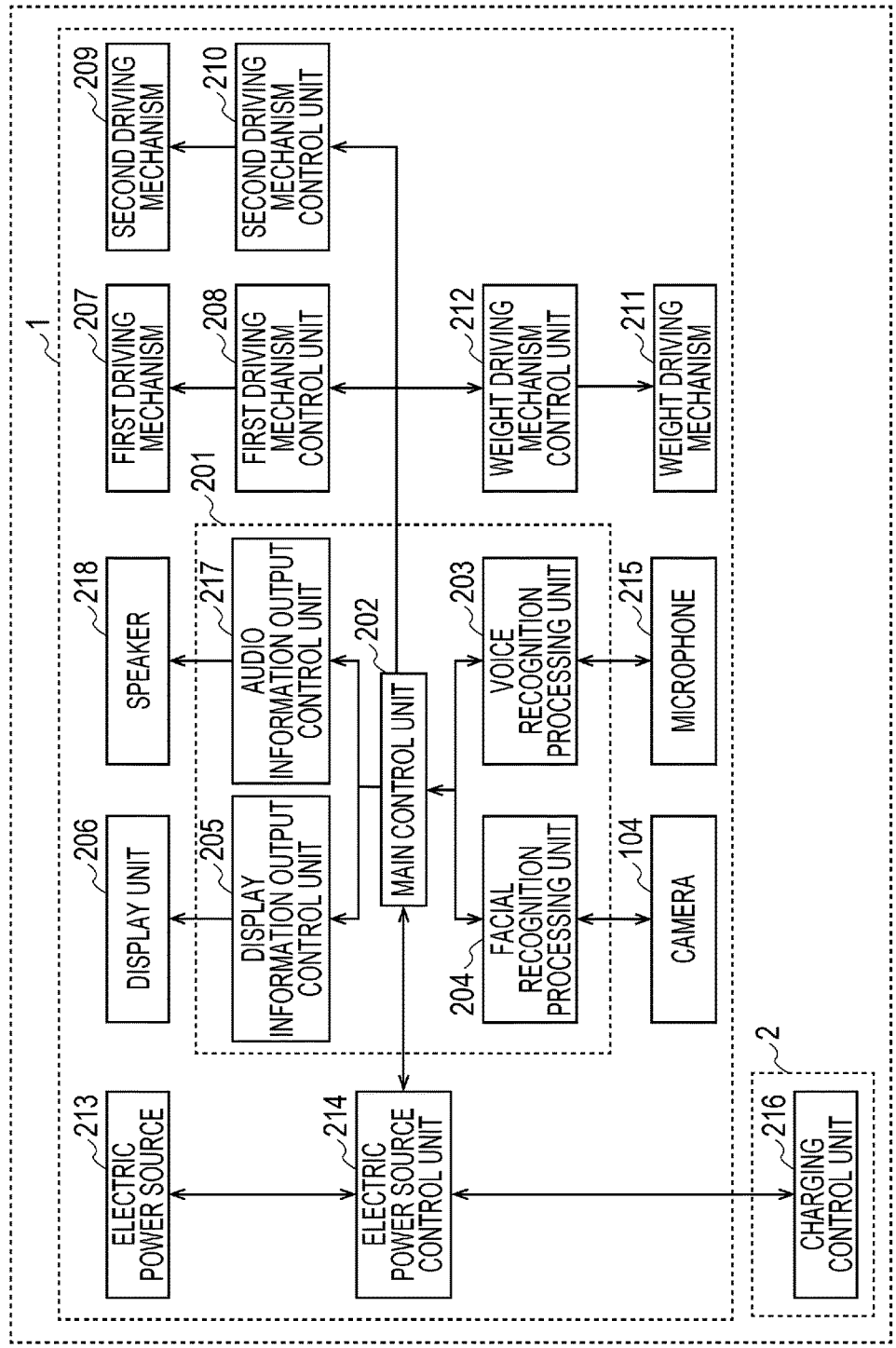
FIG. 19 is a block diagram illustrating the robot according to a second embodiment of the present disclosure and a charger used for charging the robot.

Next, a second embodiment will be described with reference to FIG. 19. FIG. 19 is a block diagram illustrating the robot 1 according to the second embodiment of the present disclosure, and the charger 2 used for charging the robot 1. Components in FIG. 19 that are the same as those in FIG. 16 will be denoted with the same reference numerals, and description thereof will be omitted.

Unlike the first embodiment, the robot 1 according to the second embodiment further has an audio information output control unit 217 and a speaker 218. The audio information output control unit 217 in FIG. 19 outputs audio information to the effect that the amount of remaining electric power of the electric power source 213 is low to the speaker 218, in accordance with commands output from the main control unit 202. The speaker 218 then outputs the audio information of the robot 1.

According to the present embodiment, in a case where the amount of remaining electric power of the electric power source is a predetermined value or lower in a state where electric power is not being charged from the charger 2, the main control unit 202 outputs audio information notifying the user that the amount of remaining electric power of the electric power source 213 is low via the speaker 218.

Also, according to the present embodiment, in a case where the amount of remaining electric power of the electric power source 213 is a predetermined value or lower in a state where electric power is not being charged from the charger 2, the main control unit 202 can use the display unit 206 to display emotion display information to the effect that the amount of remaining electric power of the electric power source 213 is low.

Thus, according to the present embodiment, in a case where the amount of remaining electric power of the electric power source 213 is a predetermined value or lower in a state where electric power is not being charged from the charger 2, not only does the robot 1 express a state of being out of breath or a state of being sleepy, but also notifies the user of the amount of remaining electric power of the electric power source 213 by the above-described audio information and display information. Accordingly, the user can comprehend the amount of remaining electric power of the electric power source 213 even more readily.

Overview of Embodiments of Present Disclosure

A robot according to an aspect of the present disclosure includes:

a spherical-band-shaped main casing where a first side portion of a sphere and a second side portion opposing the first side portion have been cut away;

a first spherical cap corresponding to the first side portion;

a second spherical cap corresponding to the second side portion;

a shaft linking the first spherical cap and the second spherical cap;

a display unit that is attached to the shaft via an arm and that displays at least a portion of a face of the robot;

a first driving mechanism that causes the first spherical cap and the second spherical cap to be rotated by rotation of the shaft;

a second driving mechanism, independent from the first driving mechanism, that causes the main casing to be rotated centered on the shaft;

an electric power source that is charged by electric power from an external charger, and supplies the electric power to the first driving mechanism and the second driving mechanism; and a control circuit which, in a case where an amount of remaining electric power of the electric power source is a predetermined value or lower in a state where electric power is not being charged from the charger, controls the second driving mechanism and stops rotation of the main casing and controls the first driving mechanism to switch the rotational direction of the first spherical cap and the second spherical cap, thereby causing the display unit to be reciprocally moved in the vertical direction.

In a case where the amount of remaining electric power of the electric power source is at a predetermined value or lower and the robot does not move any more, the user cannot distinguish whether the robot is not moving because the charge has been spent, or is not moving due to a malfunction. Also, displaying the amount of remaining electric power of the electric power source on the surface of the spherical robot that has no arms or legs would be making a display on the face of the robot that differs from facial components which would be unnatural.

In a case where the amount of remaining electric power of the electric power source is a predetermined value or lower in a state where electric power is not being charged from the charger, the display unit is reciprocally moved in the vertical direction, expressing a state of the robot being out of breath or a state of being sleepy. In this case, the display unit displays a part of the face of the robot, the eyes for example. Accordingly, even if the robot is spherical without arms or legs, for example, the state of the electric power source can be expressed to the user by reciprocally moving the display unit in the vertical direction, without making a display expressing the remaining amount of electric power of the electric power source on the surface of the spherical robot.

The spherical-band shaped main casing, the first spherical cap, and the second spherical cap may make up the sphere.

A camera may be attached to at least one of the first spherical cap and the second spherical cap, and in a case where an amount of remaining electric power of the electric power source is a predetermined value or lower in a state where electric power is not being charged from the charger, and an image taken by the camera is recognized to be a part of a user, the control circuit may control the second driving mechanism and stop rotation of the main casing and control the first driving mechanism to switch the rotational direction of the first spherical cap and the second spherical cap, thereby causing the display unit to be reciprocally moved in the vertical direction.

According to the above configuration, the display unit is reciprocally moved in the vertical direction, expressing a state of the robot being out of breath or a state of being sleepy, not just in a case where the amount of remaining electric power of the electric power source is a predetermined value or lower in a state where electric power is not being charged from the charger, but also in a case where an image taken by the camera is recognized to be a part of the user.

The charging state of the robot is meaningful information only when notified to the user, so in the above configuration, confirmation is made that the user is around the robot, and the charging state of the robot is notified to the user. Accordingly, in a case where the amount of remaining electric power of the electric power source is the predetermined value or lower, a situation where the robot reciprocally moves the display unit in the vertical direction even though the user to be notified is not around the robot, thereby needlessly consuming electric power, can be prevented.

The part of the user may be a face.

If the face of the user can be recognized by the camera, it is conceivable that the distance between the robot and the user is relatively close, although this depends on the resolution of the camera. According to the above configuration, in a case where the distance between the robot and user is relatively close, a state of the robot being out of breath or a state of being state of being sleepy is expressed, to notify the user of the charging state of the robot. Accordingly, the user is notified of the charging state of the robot in a situation where the charging state of the robot can be readily recognized by the user. As a result, the probability of the charging state of the robot being recognized by the user can be increased, while suppressing electric power consumed for notification of the charging state.

A camera may be attached to at least one of the first spherical cap and the second spherical cap, and in a case where an amount of remaining electric power of the electric power source is a predetermined value or lower in a state where electric power is not being charged from the charger, and an image taken by the camera is recognized to be a part of a user, the control circuit may control the second driving mechanism and stop rotation of the main casing in a state with the display unit facing the object recognized to be the face of the user, and control the first driving mechanism to switch the rotational direction of the first spherical cap and the second spherical cap, thereby causing the display unit to be reciprocally moved in the vertical direction.

According to the above configuration, by stopping with the face of the robot facing the user, an action of appealing to the user regarding a state of the robot being out of breath or a state of being sleepy is expressed.

Even a spherical robot with no arms or legs, for example, can accurately indicate to the user that the remaining charge in the electric power source is low in interaction between the robot and the user, without displaying the amount of remaining electric power of the electric power source on the surface of the spherical robot.

A camera may be attached to at least one of the first spherical cap and the second spherical cap, and in a case where an amount of remaining electric power of the electric power source is a predetermined value or lower in a state where electric power is not being charged from the charger, and an image taken by the camera is recognized to be a part of a user, the control circuit may control the second driving mechanism and stop rotation of the main casing in a state with the display unit facing a position lower than the object recognized to be the face of the user, and control the first driving mechanism to switch the rotational direction of the first spherical cap and the second spherical cap, thereby causing the display unit to be reciprocally moved in the vertical direction.

According to the above configuration, the robot stops in a state where the robot is looking down when the user looks at the robot, thereby expressing an action of appealing to the user regarding a state of the robot being out of breath or a state of being sleepy. This presents a state of being even more tired to the user.

Even a spherical robot with no arms or legs, for example, can accurately indicate to the user that the remaining charge in the electric power source is low in interaction between the robot and the user, without displaying the amount of remaining electric power of the electric power source on the surface of the spherical robot.

A camera may be attached to at least one of the first spherical cap and the second spherical cap, a microphone that collects sound may be provided, and in a case where an amount of remaining electric power of the electric power source is a predetermined value or lower in a state where electric power is not being charged from the charger, and an image taken by the camera is recognized to be a part of a user and also sound collected by the microphone is recognized to be voice of the user, the control circuit may control the second driving mechanism and stop rotation of the main casing, and control the first driving mechanism to switch the rotational direction of the first spherical cap and the second spherical cap, thereby causing the display unit to be reciprocally moved in the vertical direction.

According to the above configuration, the display unit is reciprocally moved in the vertical direction, expressing a state of the robot being out of breath or a state of being sleepy, not just in a case where the amount of remaining electric power of the electric power source is a predetermined value or lower in a state where electric power is not being charged from the charger, but also in a case where an image taken by the camera is recognized to be a part of the user and also sound collected by the microphone is recognized to be voice of the user.

The charging state of the robot is meaningful information only when notified to the user, so in the above configuration, confirmation is made that the user is around the robot using both images and voice, and the charging state of the robot is notified to the user.

Accordingly, in a case where the amount of remaining electric power of the electric power source is the predetermined value or lower, a situation where the robot reciprocally moves the display unit in the vertical direction even though the user to be notified is not around the robot, thereby needlessly consuming electric power, can be prevented in a surer manner.

A camera may be attached to at least one of the first spherical cap and the second spherical cap, a microphone that collects sound may be provided, and in a case where an amount of remaining electric power of the electric power source is a predetermined value or lower in a state where electric power is not being charged from the charger, and an image taken by the camera is not recognized to be a part of a user but sound collected by the microphone is recognized to be voice of the user, the control circuit may control the second driving mechanism and stop rotation of the main casing, and control the first driving mechanism to switch the rotational direction of the first spherical cap and the second spherical cap, thereby causing the display unit to be reciprocally moved in the vertical direction.

According to the above configuration, the display unit is reciprocally moved in the vertical direction, expressing a state of the robot being out of breath or a state of being sleepy, not just in a case where the amount of remaining electric power of the electric power source is a predetermined value or lower in a state where electric power is not being charged from the charger, but also in a case where sound collected by the microphone is recognized to be voice of the user.

There may be cases where the user is around the robot, but the user cannot be recognized by the camera due to the camera of the robot not facing the direction of the user. Even in such cases, there may be cases where the voice of the user can be recognized. In a case where the voice of the user can be recognized even though the user cannot be recognized by images, determination is made in the above configuration that the user is around the robot, and the charging state of the robot is notified to the user.

Accordingly, in a case where the amount of remaining electric power of the electric power source is the predetermined value or lower, a situation where the robot reciprocally moves the display unit in the vertical direction even though the user to be notified is not around the robot, thereby needlessly consuming electric power, can be prevented in a sure manner.

A camera may be attached to at least one of the first spherical cap and the second spherical cap, a microphone that collects sound may be provided, and in a case where an amount of remaining electric power of the electric power source is a predetermined value or lower in a state where electric power is not being charged from the charger, and an image taken by the camera is not recognized to be a part of a user and also sound collected by the microphone is not recognized to be voice of the user, the control circuit may control the second driving mechanism and stop rotation of the main casing, and control the first driving mechanism to stop rotation of the first spherical cap and the second spherical cap.

According to the above configuration, actions of expressing the charging state of the robot, such as expressing a state of the robot being out of breath or a state of being sleepy for example, are not performed in a case where the amount of remaining electric power of the electric power source is a predetermined value or lower in a state where electric power is not being charged from the charger, but an image taken by the camera is not recognized to be a part of the user and sound collected by the microphone is not recognized to be voice of the user.

The charging state of the robot is meaningful information only when notified to the user, so in the above configuration, if determination is made that the user is not around the robot using both images and voice, the charging state of the robot is not notified to the surroundings. Accordingly, in a case where the amount of remaining electric power of the electric power source is the predetermined value or lower, a situation where electric power is needlessly consumed even though the user to be notified is not around the robot.

The control circuit may control the first driving mechanism to switch the rotational direction of the first spherical cap and the second spherical cap during a period of the display unit moving reciprocally in the vertical direction for two reciprocal movements or more.

In a case of expressing the robot in a state of being out of breath or a state of being sleepy simply by the action of reciprocally moving the display unit in the vertical direction, it may be difficult to distinguish this from an action of nodding in response to a question from the user. In this case, there is a possibility that accurately telling the user that the amount of remaining electric power of the electric power source is low will be difficult.

When nodding, an action of the robot moving the face vertically one time is common. Accordingly, in the above configuration, the first driving mechanism is controlled to switch the rotational direction of the first spherical cap and the second spherical cap during a period of the display unit moving reciprocally in the vertical direction for two reciprocal movements or more, as an action to tell the user that the amount of remaining electric power of the electric lower source is low.

Accordingly, in a case of expressing the robot in a state of being out of breath or a state of being sleepy simply by the action of reciprocally moving the display unit in the vertical direction, this can be easily distinguished from an action of nodding in response to a question from the user. As a result, the user can be notified that the amount of remaining electric power of the electric power source is low in a sure manner.

The lower the amount of remaining electric power of the electric power source is, the more the control circuit may increase the number of times per unit time of switching the rotational direction of the first spherical cap and the second spherical cap.

According to the above configuration, the lower the amount of remaining electric power of the electric power source is, the greater the number of times per unit time the rotational direction of the first spherical cap and the second spherical cap is switched is. Accordingly, the lower the amount of remaining electric power of the electric power source is, the stronger the expression of the state of the robot being out of breath is.

On the other hand, the lower the amount of remaining electric power of the electric power source is, the number of times per unit time of switching the rotational direction of the first spherical cap and the second spherical cap is increased, so the consumption of the electric power of the electric power source increases. However, in the above configuration, a strong expression of the state of the robot being out of breath is made even if this means sacrificing the amount of remaining electric power of the electric power source, thereby emphatically notifying the user that amount of remaining electric power of the electric power source is low. Accordingly, even a spherical robot with no arms or legs, for example, can emphatically appeal to the user that the remaining charge in the electric power source is low, without displaying the amount of remaining electric power of the electric power source on the surface of the spherical robot.

The lower the amount of remaining electric power of the electric power source is, the more the control circuit may increase the amount of movement of the first spherical cap and the second spherical cap by switching the rotational direction of the first spherical cap and the second spherical cap.

According to the above configuration, the lower the amount of remaining electric power of the electric power source is, the more the amount of movement of the first spherical cap and the second spherical cap, by switching the rotational direction of the first spherical cap and the second spherical cap, is increased. Accordingly, the lower the amount of remaining electric power of the electric power source is, the sleepier a state of the robot is expressed.

On the other hand, the lower the amount of remaining electric power of the electric power source is, the more the amount of movement of the first spherical cap and the second spherical cap by switching the rotational direction of the first spherical cap and the second spherical cap is increased, so the consumption of the electric power of the electric power source increases. However, in the above configuration, a strong expression of the state of the robot being sleepy is made even if this means sacrificing the amount of remaining electric power of the electric power source, thereby emphatically notifying the user that amount of remaining electric power of the electric power source is low. Accordingly, even a spherical robot with no arms or legs, for example, can emphatically appeal to the user that the remaining charge in the electric power source is low, without displaying the amount of remaining electric power of the electric power source on the surface of the spherical robot.

In a case where an amount of remaining electric power of the electric power source is a predetermined value or lower in a state where electric power is not being charged from the charger, the control circuit may first control the first driving mechanism to switch the rotational direction of the first spherical cap and the second spherical cap, and thereafter control the second driving mechanism and stop rotation of the main casing.

Stopping of rotation of the main casing and switching of the rotational direction of the first spherical cap and the second spherical cap do not necessarily have to be performed at the same time. Processing of switching the rotational direction of the first spherical cap and the second spherical cap may be started while performing moving actions.

A speaker may be provided,
and in a case where an amount of remaining electric power of the electric power source is a predetermined value or lower in a state where electric power is not being charged from the charger, the control circuit may output audio information to the effect that the amount of remaining electric power of the electric power source is low, via the speaker.

In a case where an amount of remaining electric power of the electric power source is a predetermined value or lower in a state where electric power is not being charged from the charger, the control circuit may display expression display information to the effect that the amount of remaining electric power of the electric power source is low, using the display unit.

At least part of the face of the robot displayed on the display unit may be an eye.

At least part of the face of the robot displayed on the display unit may be a mouth.

A robot according to an exemplary embodiment of the present disclosure is useful in notifying a user of a charging state within the robot, in a state of not being placed on a charging stand.

What is claimed is:

1. A robot, comprising:
    a spherical body, including:
        a spherical-band-shaped main casing where a first side portion of a sphere and a second side portion opposing the first side portion have been removed,
        a first spherical cap corresponding to the first side portion, and
        a second spherical cap corresponding to the second side portion;
    a shaft linking the first spherical cap and the second spherical cap;
    a display attached to the shaft via an arm and displays at least a part of a face of the robot;
    a first driving mechanism that causes the first spherical cap and the second spherical cap to be rotated by a rotation of the shaft;
    a second driving mechanism, independent from the first driving mechanism, that causes the main casing to be rotated, the main casing being centered on the shaft;
    an electric power source that is charged by electric power from an external charger, and supplies the electric power to the first driving mechanism and the second driving mechanism; and
    a control circuit, when an amount of electric power of the electric power source remaining is lower than or equal to a predetermined value while the electric power source is disconnected from the charger, controls the second driving mechanism to stop a rotation of the main casing and controls the first driving mechanism to switch a rotational direction of the first spherical cap and the second spherical cap, thereby causing the display to be reciprocally moved in a vertical direction.

2. The robot according to claim 1,
further comprising a camera attached to at least one of the first spherical cap and the second spherical cap,
wherein, when the amount of electric power of the electric power source remaining is lower than or equal to the predetermined value while the electric power source is disconnected from the charger, and an image taken by the camera is recognized as including a part of a user, the control circuit controls the second driving mechanism to stop the rotation of the main casing and controls the first driving mechanism to switch the rotational direction of the first spherical cap and the second spherical cap, thereby causing the display to be reciprocally moved in the vertical direction.

3. The robot according to claim 2,
wherein the part of the user is a face.

4. The robot according to claim 1,
further comprising a camera attached to at least one of the first spherical cap and the second spherical cap,
wherein, when
    the amount of electric power of the electric power source remaining is lower than or equal to the predetermined value while the electric power source is disconnected from the charger, and
    an image taken by the camera is recognized as including a part of a user,
the control circuit controls the second driving mechanism to stop the rotation of the main casing in a state with the display facing the face of the user, and controls the first driving mechanism to switch the rotational direction of the first spherical cap and the second spherical cap, thereby causing the display to be reciprocally moved in the vertical direction.

5. The robot according to claim 1,
further comprising a camera attached to at least one of the first spherical cap and the second spherical cap,
wherein, when
   the amount of electric power of the electric power source remaining is lower than or equal to the predetermined value while the electric power source is disconnected from the charger, and
   an image taken by the camera is recognized as including a part of a user,
   the control circuit controls the second driving mechanism and to stop the rotation of the main casing in a state with the display facing a position lower than the face of the user, and controls the first driving mechanism to switch the rotational direction of the first spherical cap and the second spherical cap, thereby causing the display to be reciprocally moved in the vertical direction.

6. The robot according to claim 1,
further comprising a camera attached to at least one of the first spherical cap and the second spherical cap; and
a microphone that collects sound is provided,
wherein, when
   the amount of electric power of the electric power source remaining is lower than or equal to the predetermined value while the electric power source is disconnected from the charger,
   an image taken by the camera is recognized as including a part of a user, and
   sound collected by the microphone is recognized as including voice of the user,
   the control circuit controls the second driving mechanism to stop the rotation of the main casing, and controls the first driving mechanism to switch the rotational direction of the first spherical cap and the second spherical cap, thereby causing the display to be reciprocally moved in the vertical direction.

7. The robot according to claim 1,
further comprising a camera attached to at least one of the first spherical cap and the second spherical cap; and
a microphone that collects sound is provided,
wherein, when
   the amount of remaining electric power of the electric power source remaining is lower than or equal to the predetermined value while the electric power source is disconnected from the charger,
   an image taken by the camera is recognized as not including a part of a user, and
   sound collected by the microphone is recognized as including voice of the user,
the control circuit controls the second driving mechanism to stop the rotation of the main casing, and controls the first driving mechanism to switch the rotational direction of the first spherical cap and the second spherical cap, thereby causing the display to be reciprocally moved in the vertical direction.

8. The robot according to claim 1,
further comprising a camera attached to at least one of the first spherical cap and the second spherical cap; and
a microphone that collects sound is provided,
wherein, when
   the amount of electric power of the electric power source remaining is lower than or equal to the predetermined value while the electric power source is disconnected from the charger,
   an image taken by the camera is recognized as not including a part of a user, and
   sound collected by the microphone is recognized as not including voice of the user,
   the control circuit controls the second driving mechanism to stop the rotation of the main casing, and controls the first driving mechanism to stop the rotation of the first spherical cap and the second spherical cap.

9. The robot according to claim 1,
wherein the control circuit controls the first driving mechanism to switch the rotational direction of the first spherical cap and the second spherical cap during a period of the display moving reciprocally in the vertical direction for two reciprocal movements.

10. The robot according to claim 1,
wherein, when the amount of electric power of the electric power source remaining is decreased, the control circuit increases a frequency of the switching the rotational direction of the first spherical cap and the second spherical cap.

11. The robot according to claim 1,
wherein, when the amount of electric power of the electric power source remaining is decreased, the control circuit increases an amount of movement of the first spherical cap and the second spherical cap by switching the rotational direction of the first spherical cap and the second spherical cap.

12. The robot according to claim 1,
wherein, when the amount of electric power of the electric power source remaining is lower than or equal to the predetermined value while the electric power source is disconnected from the charger, the control circuit controls the first driving mechanism to switch the rotational direction of the first spherical cap and the second spherical cap, and thereafter controls the second driving mechanism to stop the rotation of the main casing.

13. The robot according to claim 1,
further comprising a speaker to output sound,
wherein, when the amount of electric power of the electric power source remaining is lower than or equal to the predetermined value while the electric power source is disconnected from the charger, the control circuit outputs audio information indicating the amount of electric power of the electric power source remaining, via the speaker.

14. The robot according to claim 1,
wherein, when the amount of electric power of the electric power source remaining is lower than or equal to the predetermined value while the electric power source is disconnected from the charger, the control circuit displays expression display information indicating the amount of electric power of the electric power source remaining, using the display.

15. The robot according to claim 1,
wherein the at least part of the face of the robot displayed on the display is an eye.

16. The robot according to claim 1,
wherein the at least part of the face of the robot displayed on the display is a mouth.

17. The robot according to claim 14,
wherein the expression display information is an image of a facial expression.

18. The robot according to claim 14,
wherein the expression display information is an image of an emoji.

\* \* \* \* \*